US007950570B2

(12) United States Patent
Marchasin et al.

(10) Patent No.: US 7,950,570 B2
(45) Date of Patent: May 31, 2011

(54) PARKING ENVIRONMENT MANAGEMENT SYSTEM AND METHOD

(75) Inventors: Cory D. Marchasin, Lambertville, NJ (US); Patrick J. Moynihan, Bedminster, NJ (US); Josiah D. Johnson, Bedminster, NJ (US); Lawrence Berman, Delray Beach, FL (US)

(73) Assignee: IPT, LLC, Somerville, NJ (US)

( * ) Notice: Subject to any disclaimer, the term of this patent is extended or adjusted under 35 U.S.C. 154(b) by 1279 days.

(21) Appl. No.: 11/395,764

(22) Filed: Mar. 31, 2006

(65) Prior Publication Data

US 2006/0255119 A1    Nov. 16, 2006

Related U.S. Application Data

(63) Continuation-in-part of application No. 11/122,953, filed on May 5, 2005, and a continuation-in-part of application No. 11/281,841, filed on Nov. 16, 2005.

(60) Provisional application No. 60/580,193, filed on Jun. 16, 2004.

(51) Int. Cl.
*G06F 17/00* (2006.01)
*G06K 5/00* (2006.01)
*G06K 7/00* (2006.01)
*G07B 15/02* (2011.01)
*G07B 15/00* (2011.01)
*G07B 13/04* (2006.01)
*B60R 25/00* (2006.01)

(52) U.S. Cl. ........ 235/375; 235/380; 235/384; 235/492; 235/435; 235/472.02; 705/13; 705/418; 705/417; 70/226; 194/902; 194/900; 340/932.2; 340/933; 340/572.1

(58) Field of Classification Search .......... 235/380, 235/384, 492, 684, 435, 472.02; 705/1, 13, 705/418, 417; 70/226; 194/902, 900; 340/932.2, 340/933, 573.1
See application file for complete search history.

(56) References Cited

U.S. PATENT DOCUMENTS 1,489,272 A    4/1924    Murrah
(Continued)

FOREIGN PATENT DOCUMENTS

CA    608990    11/1960
(Continued)

OTHER PUBLICATIONS

International Search Report dated Dec. 20, 2007 for PCT/US2006/11725.

(Continued)

*Primary Examiner* — Daniel Walsh
(74) *Attorney, Agent, or Firm* — Sills Cummis & Gross P.C.

(57) ABSTRACT

A system and method for managing a permit-based parking environment governed by a parking program. The permit-based parking environment includes a number of parking permits each including a unique RFID tag and tag number. One or more RFID readers are used to scan the vehicles parked in the parking environment to determine if a RFID tag is associated with the parked vehicle. The results of the scan along with information related to the parked vehicle are provided to a permit management system to determine if the vehicle is parked within the scope of privileges pre-defined for that vehicle, pursuant to the parking program governing the parking environment. The permit management system stores, manages, and monitors data related to the permits controlled under the parking program.

14 Claims, 9 Drawing Sheets

U.S. PATENT DOCUMENTS

| | | | |
|---|---|---|---|
| 1,530,622 A | 3/1925 | Roberts | |
| 2,960,857 A | 11/1960 | Winter | |
| 3,907,072 A | 9/1975 | Shafer | |
| 4,509,347 A | 4/1985 | Young | |
| 4,649,724 A | 3/1987 | Raine | |
| 4,768,359 A | 9/1988 | Wade | |
| 4,770,013 A | 9/1988 | Nakai | |
| 4,881,766 A | 11/1989 | Schmidt et al. | |
| 5,134,868 A | 8/1992 | Bethards | |
| 5,263,118 A * | 11/1993 | Cornelison | 704/200 |
| 5,315,848 A | 5/1994 | Beyer | |
| 5,372,018 A | 12/1994 | Smith | |
| 5,412,963 A | 5/1995 | Carlo et al. | |
| 5,432,508 A * | 7/1995 | Jackson | 340/932.2 |
| 5,636,537 A | 6/1997 | Chen | |
| 5,673,574 A | 10/1997 | Bertram | |
| 5,740,050 A * | 4/1998 | Ward, II | 705/418 |
| 5,829,285 A * | 11/1998 | Wilson | 70/226 |
| 5,862,688 A | 1/1999 | Odegard | |
| 5,905,247 A * | 5/1999 | Ilen | 235/384 |
| 5,940,481 A * | 8/1999 | Zeitman | 705/13 |
| 6,032,497 A | 3/2000 | Fulcher et al. | |
| 6,037,880 A * | 3/2000 | Manion | 340/932.2 |
| 6,049,269 A | 4/2000 | Byrd et al. | |
| 6,081,206 A * | 6/2000 | Kielland | 340/937 |
| 6,265,973 B1 | 7/2001 | Brammall et al. | |
| 6,344,806 B1 * | 2/2002 | Katz | 340/932.2 |
| 6,481,622 B2 * | 11/2002 | Hjelmvik | 235/384 |
| 6,513,711 B1 * | 2/2003 | Hjelmvik | 235/385 |
| 6,522,264 B1 | 2/2003 | Stewart | |
| 6,559,776 B2 * | 5/2003 | Katz | 340/932.2 |
| 6,693,539 B2 | 2/2004 | Bowers et al. | |
| 6,714,121 B1 | 3/2004 | Moore | |
| 6,734,795 B2 | 5/2004 | Price | |
| 6,736,316 B2 | 5/2004 | Neumark | |
| 6,738,628 B1 | 5/2004 | McCall et al. | |
| 6,745,603 B1 | 6/2004 | Shaw | |
| 6,865,539 B1 * | 3/2005 | Pugliese, III | 705/5 |
| 7,114,651 B2 * | 10/2006 | Hjelmvik | 235/384 |
| 7,296,755 B2 * | 11/2007 | Nakajima | 235/492 |
| 7,346,439 B2 * | 3/2008 | Bodin | 701/36 |
| 2002/0008639 A1 * | 1/2002 | Dee | 340/932.2 |
| 2002/0099574 A1 * | 7/2002 | Cahill et al. | 705/5 |
| 2002/0109610 A1 * | 8/2002 | Katz | 340/932.2 |
| 2002/0125998 A1 * | 9/2002 | Petite et al. | 340/286.01 |
| 2002/0163443 A1 | 11/2002 | Stewart et al. | |
| 2003/0010821 A1 * | 1/2003 | Silberberg | 235/382 |
| 2003/0132840 A1 * | 7/2003 | Bahar | 340/541 |
| 2003/0141363 A1 * | 7/2003 | Hjelmvik | 235/382 |
| 2003/0206117 A1 * | 11/2003 | Rosenberg et al. | 340/932.2 |
| 2003/0222792 A1 | 12/2003 | Berman et al. | |
| 2004/0039632 A1 * | 2/2004 | Han et al. | 705/13 |
| 2004/0227616 A1 | 11/2004 | Lafferty | |
| 2004/0254840 A1 * | 12/2004 | Slemmer et al. | 705/22 |
| 2005/0068196 A1 * | 3/2005 | Marin | 340/932.2 |
| 2005/0086099 A1 * | 4/2005 | Hjelmvik | 705/13 |
| 2005/0088320 A1 * | 4/2005 | Kovach | 340/933 |
| 2005/0138630 A1 * | 6/2005 | Reynolds | 719/310 |
| 2005/0171660 A1 * | 8/2005 | Woolford et al. | 701/33 |
| 2005/0270178 A1 * | 12/2005 | Ioli | 340/932.2 |
| 2005/0279820 A1 * | 12/2005 | Moynihan et al. | 235/375 |
| 2006/0129500 A1 * | 6/2006 | Mandy et al. | 705/65 |
| 2006/0152349 A1 * | 7/2006 | Ratnakar | 340/426.1 |
| 2006/0212344 A1 * | 9/2006 | Marcus et al. | 705/13 |
| 2006/0227010 A1 * | 10/2006 | Berstis et al. | 340/932.2 |
| 2006/0255119 A1 * | 11/2006 | Marchasin et al. | 235/375 |
| 2007/0046484 A1 * | 3/2007 | Bucholz et al. | 340/686.1 |
| 2007/0112620 A1 * | 5/2007 | Johnson et al. | 705/13 |
| 2008/0218383 A1 * | 9/2008 | Franklin et al. | 340/937 |
| 2008/0238719 A1 * | 10/2008 | Marchasin et al. | 340/901 |

FOREIGN PATENT DOCUMENTS

| | | |
|---|---|---|
| CH | 672 617 A | 12/1989 |
| GB | 489155 | 7/1938 |
| GB | 3003281 | 8/2002 |
| GB | 3007353 | 10/2002 |
| GB | 3008370 | 2/2003 |
| GB | 3009101 | 2/2003 |
| JP | 58-076348 | 5/1983 |
| JP | 2002-208043 | 7/2002 |
| JP | 2004-199604 | 7/2004 |
| WO | WO 98/12083 | 3/1998 |

OTHER PUBLICATIONS

International Search Report dated Jul. 7, 2008 for PCT/US2007/08271.

International Search Report dated Nov. 17, 2005 for PCT/US2005/016476.

* cited by examiner

PARKING ENVIRONMENT MANAGEMENT SYSTEM AND METHOD

CROSS-REFERENCE TO RELATED APPLICATIONS

This application is a continuation-in-part of U.S. patent application Ser. No. 11/122,953, titled "Vehicle Violation Enforcement System and Method", filed May 5, 2005, which in turn claims the benefit of U.S. Provisional Application Ser. No. 60/580,193, filed Jun. 16, 2004. This application is also a continuation-in-part of U.S. patent application Ser. No. 11/281,841, titled "Permit-Based Parking Environment Management Method and System", filed Nov. 16, 2005. U.S. patent application Ser. Nos. 11/122,953, 11/281,841, and 60/580,193 are hereby incorporated by reference herein.

FIELD OF THE INVENTION

The present invention relates generally to parking regulation enforcement, and, more particularly, to a system and method for administering, managing, and monitoring parking programs.

BACKGROUND OF THE INVENTION

Publicly and privately administered parking programs continually struggle with the seemingly intractable problem of providing parking services for an area having a limited number of parking spaces to an ever increasing number of vehicles. Specifically, there is an increasing effort to manage the problem in residential communities, where cities and towns attempt to provide the local residents with a place to park. This effort generally involves the use of parking programs designed to enforce a set of rules and regulations governing parking privileges in a particular area or zone.

Traditional parking programs require enforcement of the governing parking laws and regulations by a number of enforcement agents, referred to as Parking Enforcement Officers (PEO). The PEOs monitor an area and detect parking violations, generally by visual inspection of the offending vehicles (e.g., identification of an unlawfully parked vehicle) or surrounding area (e.g., observing a vehicle position in front of a "no parking" sign, an expired parking meter, etc.)

Still other parking programs use permits to regulate and restrict parking privileges in an attempt to assure residents that the local residents are able to find a place to park their vehicles on a street or in a lot. The goal of such permit-based parking programs is to encourage persons to obtain a permit for parking privileges, or, alternatively, move non-permit holder vehicles, to metered, time-limited, or garage parking.

However, parking programs are very difficult and expensive to implement and manage. Inefficiencies in the administration of these parking programs and a lack of enforcement of the regulations are rampant problems facing today's parking programs, leading to a significant dilution in the intended benefits.

For example, a small municipality that institutes a permit-based parking program may face the task of issuing from 20,000 to 500,000 permits per year, which requires a complete overhaul of the municipality's existing parking regulation enforcement plan.

While the issuance of permits assists in the institution of parking regulations, use of conventional permits includes many disadvantages. Conventional permits are typically embodied as a sticker that either affixes to a window of the vehicle or a hang-tag that hangs within the vehicle (i.e., from the rear view mirror). However, it is often difficult to determine if a permit is present based on a visual inspection of the vehicle, due to a variety of factors including the presence of tinted windows and/or the arrangement of the vehicle (e.g., angled parking). This creates a significant burden on the individual responsible for inspecting vehicle to determine if the vehicle is legally parked, referred to as a Parking Enforcement Officer (PEO), who must locate and read the permit via a visual inspection of the vehicle.

In addition, conventional permits are frequently stolen or "scalped" (i.e., sold by the authorized permit holder to an unauthorized person). With no efficient means to track the permits administered under a parking program, such misuse is extremely difficult to detect and terminate.

In order to enforce vehicular parking laws, parking programs typically issue a ticket or summons and place the summons on the vehicle. Generally, the owner and/or operator of the vehicle reviews the summons, and is required to inquire as to the amount of the fine and the method of satisfaction. Next, the owner/operator takes steps to pay the fine and/or appear in court to contest the summons. The enforcement of the payment of the fines is haphazard in that in many instances the vehicle owner does not pay the fine and accumulates summons and fines. The fines assessed may be increased substantially for repeat violators who are termed scofflaws, who ignore such summons.

One conventional method to insure payment of fines is to immobilize the vehicle by placing a boot on the vehicle wheel. A boot is a device which is attached to the vehicle wheel to make operation of the vehicle impossible since the wheel is no longer able to roll on the pavement due to the presence of the boot. However, such boots are typically cumbersome and heavy. For example, such boots are disclosed in Japanese patent JP 58076348, UK design patents 3008370 and 3007353, and U.S. Pat. Nos. 1,489,272; 1,530,622: 3,907,072; 4,768,359; 5,134,868; 5,315,848; 5,372,018; and 5,673,574, all incorporated by reference herein in their entirety.

Boot systems of the type in use, while unpopular with motorists, have become more accepted. Thus, parking enforcement personnel place the oversize and cumbersome boot on a vehicle wheel, immobilizing the vehicle. The offender returns to the vehicle and can not use the vehicle. The offender is prompted by a sticker on the window to call the appropriate entity (e.g., a law enforcement agency) in order to obtain instructions on how to release and remove the boot. The offender is prompted during the call to make his or her way to the police station, court or administrator, without his vehicle, to a payment location. The offender is required to pay the fine for this violation and all other outstanding violations, if any. In this regard, boot systems provide for catching scofflaws who have numerous outstanding parking violations. More specifically, once a boot is attached to a scofflaw's vehicle, the authorities can maintain control of the vehicle until all outstanding violations against the owner or operator of the vehicle are paid.

Clearly, the use of the boot wheel lock is inconvenient to the offender who must try to obtain alternative transportation from whatever location he may have parked to the payment center, which could be some distance away and to which center there is no readily available transportation. Once the offender's account is settled, he or she must return to his vehicle seeking further transportation, while in parallel to the offender returning to his vehicle, to await a parking enforcement person to remove the boot. Such a person may or may not arrive at the offending vehicle in a timely manner, frustrating the offender. This process can take hours or even days, using up a portion of the collected fine by the summons issuing agency via the man hours spent in arranging for the removal of the boot and in the time necessary for removing the boot and also leaving a very disgruntled citizen.

Furthermore, it is costly for both the motorist and the agency responsible for enforcement of the traffic laws. In some cases, the boot is used in lieu of towing on private property to insure payment of parking violation fines. The tow operator may not get to the private parking facility for hours to settle the claim.

Therefore, there is a need for a method and a system for efficiently and effectively implementing, managing, administering, monitoring, and executing a parking program.

SUMMARY OF THE INVENTION

The above-described problems are addressed and a technical solution is achieved in the art by a system and a method for managing a parking environment. According to an embodiment of the present invention, the parking management system includes a detection module for determining and detecting a parking violation, an enforcement module for executing one or more enforcement actions, and a resolution module for facilitating the performance of an appropriate remedial measure in response to the enforcement action.

According to an embodiment of the present invention, the detection, enforcement, and resolution modules of the parking management system may include a permit management system, one or more RFID readers, and a number of parking permits each having a unique RFID tag and tag identifier (e.g., a tag number including a series of alphanumeric characters). The permit management system is configured to manage a permit-based parking program, as described in detail in related U.S. patent application Ser. No. 11/281,841, incorporated herein by reference.

According to an embodiment of the present invention, the enforcement component and resolution components of the parking management system may include a boot-based enforcement system comprising a plurality of vehicle boots each having a unique boot RFID tag and boot tag identifier (e.g., a tag number including a series of alphanumeric characters) readable by the one or more RFID readers and a boot management system, as described in detail in related U.S. patent application Ser. No. 11/122,953, incorporated herein by reference.

According to an embodiment of the invention, the permit management system, referred to as the "PermitView" system, provides for the efficient administration, management, and implementation of the detection, enforcement, and resolution modules of a permit-based parking program (herein referred to as the "parking program") governing a permit-based parking environment.

According to an embodiment of the present invention, each permit included in the parking program is assigned a unique RFID tag identifier (e.g., a tag number), which is stored on an RFID tag attached to or embedded in the permit (e.g., in the form of an RFID chip). The RFID tag identifier is associated with information or data specifically related to that parking permit, including, but not limited to, authorized vehicle data, permit holder data, and parking privilege data (collectively referred to as the "tag data").

According to an embodiment of the present invention, the PermitView system includes a computer-accessible memory for storing the RFID tag identifier and associated tag data for each permit maintained by the parking program, to allow for the ongoing management throughout the life of the permit.

According to an embodiment of the present invention, the one or more parking areas of the permit-based parking environment which are regulated under the parking program, herein referred to as the "zones," are monitored by one or more RFID readers, which may be a handheld device operated by a Parking Enforcement Officer (PEO) or a stationary reader. The RFID reader scans the parked vehicle, reads the RFID tag, and captures the RFID tag identifier. To determine if the vehicle is permissibly parked, the RFID reader accesses the computer-accessible memory of the PermitView system and looks up the tag data associated with the captured RFID tag identifier.

According to an embodiment of the present invention, the PermitView system provides for an efficient determination of whether or not the scanned vehicle is parked within the privileges associated with the permit. In the event the vehicle is parked in a manner outside the scope of parking privileges granted to that permit, an appropriate enforcement action is executed (e.g., issuance of a citation, immobilization, and/or issuance of a warning), and recorded by the PermitView system.

According to an embodiment of the present invention, the authorized vehicle data (e.g., the color, make, model, year, plate number, etc.) associated with the scanned RFID identifier is communicated to the RFID reader, for a comparison with the parked vehicle data, to determine if the permit is being used by an authorized vehicle, i.e., a vehicle associated with the permit.

According to an embodiment of the present invention, the PermitView system may be accessed via a user interface by a number of different users, such as permit holders, permit applicants, parking program managers, PermitView administrators, and the one or more readers.

According to an embodiment of the present invention, one or more docking stations, adapted for docking one or more handheld RFID readers, may access the PermitView system. The docking stations communicate with the PermitView system for synchronizing the data stored in the system and the data stored on the RFID reader. In addition, one or more stationary RFID readers may connect to the system for data synchronization.

According to an embodiment of the present invention, newly issued permits are registered in the PermitView system, which acts as a clearing house for all permits managed under the parking program. The PermitView system then tracks and monitors the use of each permit, for the life of the permit.

The PermitView system provides for the effective enforcement of parking regulations, thereby creating a safe and structured parking environment which results in a realization of benefits for the permit holders and the parking program.

According to an embodiment of the present invention, the boot-based enforcement system provides for the immobilization of an offending vehicle using a vehicle boot (i.e., the enforcement action). Optionally, the boot-based enforcement system may also provide for the administration of a fine as an enforcement action accompanying the immobilization of the vehicle. The boot-based enforcement system comprises a boot management system, referred to as the "BootView" system, provides for the administration and management of the boots. Furthermore, the BootView system facilitates the performance of the release and return of the boots following performance of the appropriate remedial measure (e.g., payment of a fine).

BRIEF DESCRIPTION OF THE DRAWINGS

The present invention will be more readily understood from the detailed description of exemplary embodiments presented below considered in conjunction with the attached drawings, of which.

Figure 1:
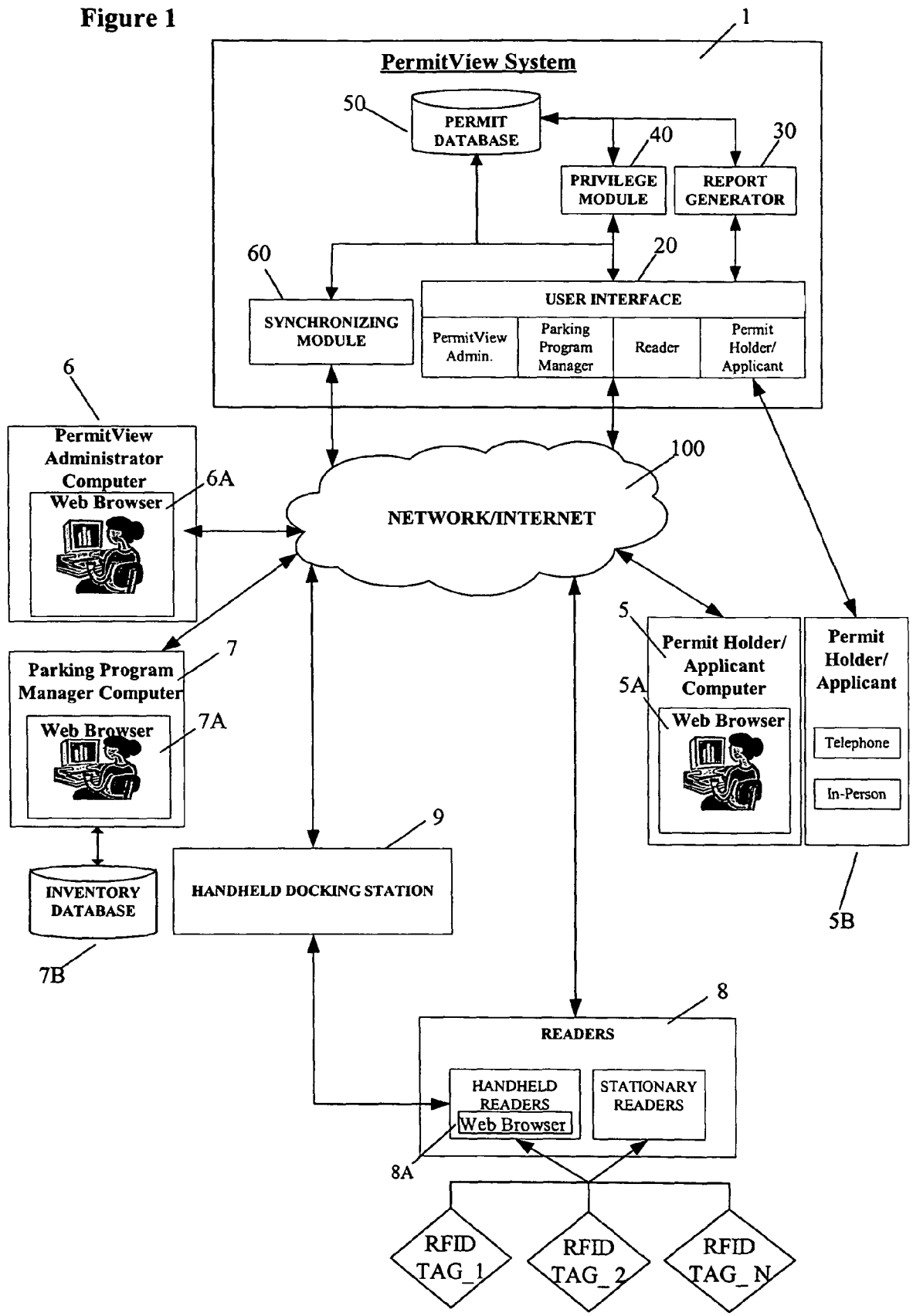
FIG. 1 is an illustration of a permit-based parking environment including a permit management system, according to an embodiment of the present invention.

It is to be understood that the attached drawings are for purposes of illustrating the concepts of the invention and may not be to scale.

DETAILED DESCRIPTION OF THE INVENTION

The present invention relates to a method and system for managing a parking environment. The parking management system comprises a detection module for detecting a parking violation (i.e., the identification of an illegally parked vehicle or a vehicle of interest), an execution module for executing an appropriate enforcement action, and a resolution module for facilitating the performance of a remedial measure by the vehicle owner/operator.

According to an embodiment of the present invention, the detection module of the parking management system identifies a parking violation or vehicle of interest, collectively referred to as a "violation" by a visual inspection of a vehicle or its surroundings (i.e., a parking meter) by an individual (i.e., a parking enforcement officer) and/or by scanning a RFID tag associated with the vehicle to determine the parking privileges assigned to that vehicle, as described in detail below.

Once the violation is detected, the enforcement module of the parking management system provides for the execution of one or more enforcement actions. The "enforcement action" may include any one or more of the following: 1) the issuance of a summons or ticket, which may have an associated fine or penalty; and/or 2) seizure of the vehicle (e.g., immobilization of the vehicle, towing of the vehicle, etc.).

Following execution of the enforcement action, the resolution module of the parking management system facilitates the performance of a remedial measure by the vehicle owner/operator which corresponds to the enforcement action. For example, if a fine is assessed and the vehicle is immobilized (the enforcement action) then the system assists the vehicle owner/operator in the payment of the fine, the release of the immobilizing device (e.g., a vehicle boot), and the return of the immobilizing device (the remedial measures).

According to an embodiment of the present invention, the resolution module is a computer-based and/or human-based system comprising a payment processor configured to communicate with a user and process payment of a fine associated with a parking violation, a release processor configured to transmit an unlock code to an immobilization device used to enforce the parking violation, and a return processor configured to communicate return instructions to the user.

The parking management system managing the entire end-to-end detection, enforcement, and resolution processes may comprise one or more computer-based systems and/or human-based systems.

According to an embodiment of the present invention, the parking environment managed by the parking management system of the present invention may include one or more parking areas or "zones," that are controlled by a parking program. The "parking program" includes the set of rules and regulations which govern parking in the zones of the parking environment.

According to an embodiment of the present invention, the detection module may include one or more parking enforcement officers identifying parking violations by a visual inspection of the vehicle (i.e., an inspection of the vehicle's license plate and/or registration sticker) and/or the vehicle's surrounding (e.g., a parking meter, curb markings, parking-related signs, etc.) Based on the visual inspection, the parking enforcement officer may determine that the vehicle is presently in violation of the governing parking regulations or, alternatively, by running a check on the license plate number, determine that one or more parking citations have been issued against the vehicle and/or the vehicle's owner (i.e., a scofflaw).

According to an embodiment of the present invention, the parking management system may be used to manage a permit-based parking environment. The detection of a parking violation in the permit-based parking environment may be performed using a permit management system (herein referred to as the PermitView System 1), one or more RFID Readers 8 for scanning vehicles located in the one or more zones, and one or more parking permits 11 (as shown in FIG. 1) each including a unique RFID tag, (referred to in FIG. 1 as RFID TAG_1, RFID TAG_2, . . . and RFID TAG_N, for a parking program having "N" number of permits). One having ordinary skill in the art will appreciate that although the present invention is described as including RFID reader technology, other reading devices and systems may be used in accordance with the invention.

According to an embodiment of the present invention, the PermitView System 1 is a computer-based system, accessible by one or more users, which includes but is not limited to the following components: a User Interface 20, a Report Generator 30, a Privilege Module 40, and a Permit Database 50. The term "computer" is intended to include any data processing device, such as a desktop computer, a laptop computer, a mainframe computer, a personal digital assistant, a server, a handheld device, or any other device able to process data. Optionally, according to an embodiment of the present invention, the PermitView System 1 may include a Synchronizing Module 60.

One having ordinary skill in the art will appreciate that the components of the PermitView System 1 may be located on a single computer, as shown in FIG. 1, or on more than one communicatively connected computers. The term "communicatively connected" is intended to include any type of connection, whether wired or wireless, in which data may be communicated. The term "communicatively connected" is intended to include a connection between devices and/or programs within a single computer or between devices and/or programs on separate computers. One having ordinary skill in the art will appreciate that at least a portion of the PermitView System 1 may include human-based components. For example, the User Interface 20 may be a call center or conventional office wherein persons (e.g., permit holders or applicants) may access the PermitView System 1 via a telephone or in-person communication 5B, as shown in FIG. 1.

The PermitView System 1 may be a computer-executable application or program accessible by a number of user groups, wherein the characteristics of the user group dictate the level, amount, and type of permissible access to the PermitView System 1. According to an embodiment of the present invention, the following primary user groups are defined: permit holders and permit applicants, parking program managers, PermitView administrators, and RFID readers. Each user group accesses the PermitView System 1 via an appropriate User Interface 20, which may be especially adapted and/or configured based on the particular user group, as shown in FIG. 1. The User Interface 20 provides user group-specific access to the PermitView System 1, wherein the level of access is customized specifically for each user group.

The 'permit holder/applicant' user group includes all persons having or seeking one or more permits related to one or more zones supervised under the parking program. As shown in FIG. 1, the permit holder/applicant user group may access the PermitView System 1 via a permit holder/applicant portal of the User Interface 20 using a computer, herein referred to as a Permit Holder/Applicant Computer 5. One having ordinary skill in the art will appreciate that the permit holder/applicant user group may also access the PermitView System 1 via other means, such as, for example, via a telephone or in-person communication 5B, as shown in FIG. 1.

The 'PermitView administrator' user group includes all persons authorized to maintain, manage, monitor, supervise, or otherwise control the PermitView System 1. As shown in FIG. 1, the PermitView administrator user group accesses the PermitView System 1 via a PermitView administrator portal of the User Interface 20 using a computer, herein referred to as a PermitView Administrator Computer 6.

The 'parking program manager' user group includes all persons authorized to maintain, manage, monitor, supervise, or otherwise control the permit-based parking program being managed by the PermitView System 1. As shown in FIG. 1, the parking program manager user group accesses the PermitView System 1 via a parking manager portal of the User Interface 20 using a computer, herein referred to as a Parking Manager Computer 7. One having ordinary skill in the art will appreciate that the parking program manager user group may access a call center and/or office-based User Interface 20 via a telephone or in-person communication.

The 'reader' user group includes any device, preferably a RFID device, adapted to scan vehicles, or readable devices enclosed therein, in the one or more zones. As shown in FIG. 1, the reader user group accesses the PermitView System 1 via a Reader portal of the User Interface 20 using a communicatively connected Reader 8.

According to an embodiment of the present invention, the Permit Holder Computer 5, the PermitView Administrator Computer 6, the Permit Manager Computer 7, and the Reader 8 may each include a Web Browser 5A, 6A, 7A, 8A, respectively, that provides a portal to one or more Web-based networks, such as, for example, a Network/Internet 100. Each Web Browser 5A, 6A, 7A, 8A is communicatively connected to the PermitView System 1 via the Network/Internet 100. One having ordinary skill in the art will appreciate that any Web browser is suitable for use in the present invention, including but not limited to FireFox, Microsoft® Internet Explorer, Netscape, Opera, WebTV®, and Mozilla™.

According to a preferred embodiment, the Reader 8 may be any suitable device or computer capable of reading a RFID tag. The Reader 8 may be a handheld device operated by a PEO, or a stationary device. One having ordinary skill in the art will appreciate that the Readers 8 may be passive, active, or semi-active. The Reader 8 may include one or more software applications or programs (e.g., RFID/Barcode scanning and permit evaluation software such as PermitFinder, citation writing software, etc.) configured to execute the functions performed the Readers 8, including, but not limited to, data capture, data storage, and scanning activity.

The Reader 8 may be configured to access data stored on a computer of in database using any suitable program or language, such as, for example, Microsoft Access, MsSQL, an open source server query language program based server side database system that is commercially available from, for example, Microsoft Corporation, plain text files (.txt) and/or other database technologies. The plain text file is key for extracting data from multiple sources and for use with a universal readable format. Suitable Readers 8 for use with the present invention include, but are not limited to, the Symbol MC9000-G RFID device. One having ordinary skill in the art will appreciate that the parking permit may include any readable device or means, other than a RFID tag. Accordingly, the Reader 8 may be any device capable of reading the readable device or means that are associated with the parking permit.

According to an embodiment of the present invention, one or more handheld docking stations 9, adapted for docking one or more handheld Readers 8, may be communicatively connected to the PermitView System 1 via the Network/Internet 100. A handheld Reader 8 may be docked in the handheld docking station 9 for synchronizing the data stored in the PermitView System 1 with the data stored on the handheld Reader 8.

According to an embodiment of the present invention, the handheld docking station 9 may communicatively connect to the PermitView System 1 via the Synchronization Module 60. The Synchronizing Module 60 may be a computer-executable module capable of downloading and/or uploading data to and from the one or more Readers 8 docked in the docking station 9. Specifically, the Synchronizing Module 60 may download/upload data including, but not limited to, lists of valid permits, software updates, PEO identification information, a list of scans performed by the PEO, a list of the scan results including any enforcement action taken (e.g., issued citations; specifics regarding immobilizations, etc.), announcements and alerts for PEOs, a list of malfunction notices (described in greater detail with respect to FIG. 2), etc. An exemplary Synchronization Module 60 suitable for use in the present invention is the SQL 2000/CE Synchronization Tool.

According to an embodiment of the present invention, the data stored on the handheld Reader 8 and in the PermitView System 1 may be synchronized in real-time via a wireless connection between the Reader 8 and the PermitView System 1.

According to an embodiment of the present invention, the PermitView System 1 includes a Report Generator 30. The Report Generator 30 is a computer-executable module configured to generate reports relating to the parking program. One having ordinary skill in the art will appreciate that a variety of reports may be generated by the Report Generator 30, said reports including any information related to the parking program which is maintained by the PermitView System 1.

Exemplary reports which may be generated include, but are not limited to, reports relating to: 1) financial information (e.g., receivables of the parking program; 2) scan results; 3) PEO-specific reports including PEO performance information (e.g., number of scans, number of warning/notices, number of citations, number of times the PEO failed to take action, etc.); 4) permit holder account information; 5) permit inventory; 6) enforcement action information; 7) parked vehicle data; and 8) tag data.

The user groups (permit holders/applicants, parking program managers, readers, and/or PermitView administrators) may submit a request for a report to the Report Generator 30 via the User Interface 20. Based on the report request, the Report Generator 30 retrieves the appropriate information from the communicatively connected computer-accessible memory, referred to the Permit Database 50, generates the report, and provides the report to the requesting user group, via the User Interface 20 or the Synchronizing Module 60. The term "computer-accessible memory" is intended to include any computer-accessible data storage device or database, whether volatile or nonvolatile, electronic, optical, or otherwise, including but not limited to, floppy disks, hard disks, CD-ROMs, DVDs, flash memories, ROMs, and RAMs.

One having ordinary skill in the art will appreciate that the Report Generator 30 may be configured to automatically run reports at one or more specific intervals of time (e.g., hourly, daily, weekly, monthly, yearly, etc.) according to a pre-determined and customizable schedule. For example, the Report Generator 30 may run a daily report detailing each violation that occurred in a particular zone during the previous 24 hour period, and automatically deliver said report to the Parking Program Manager Computer 7 and/or the Reader 8 associated with that zone.

According to an embodiment of the present invention, the Report Generator 30 may automatically receive report requests from the communicatively connected Synchronizing Module 60, pursuant to a pre-determined schedule. For example, the Synchronizing Module 60 may send a daily request for a report providing permit data updates, for communication with the one or more Readers 8 docked in the Handheld Docking Station 9.

According to an embodiment of the present invention, when the Handheld Docking Station 9 detects the docking of a Reader 8, it may automatic send a report request to the Synchronizing Module 60. The Synchronizing Module 60 may then send the request to the Report Generator 30 for fulfillment. For example, the Handheld Docking Station 9 may be configured to automatically request a report including updated permit holder information for a particular zone associated with a specific Reader 8, each time that the specific Reader 8 is docked in the Handheld Docking Station 9.

Figure 2:
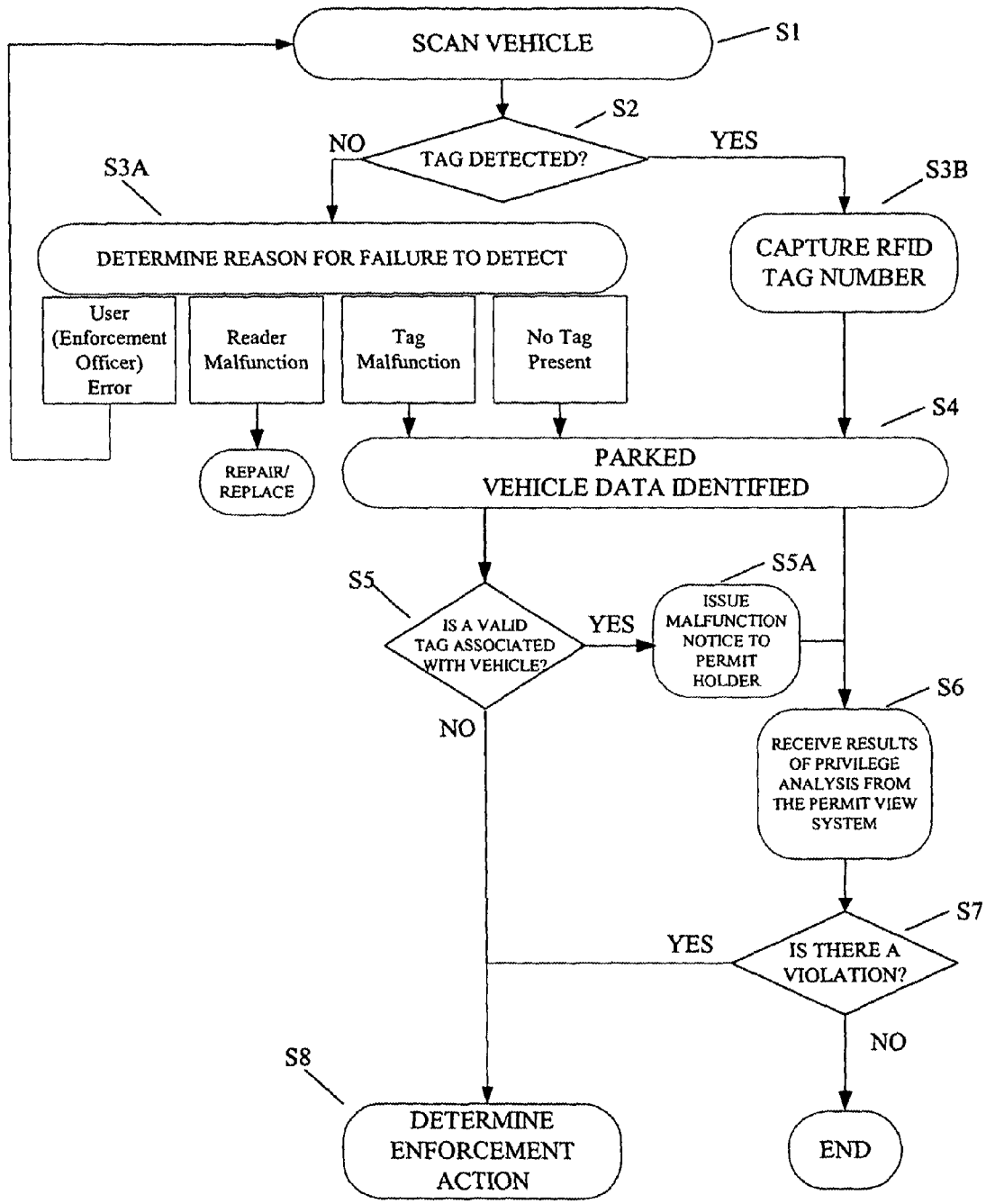
FIG. 2 illustrates an exemplary process for managing a permit-based parking environment, according to an embodiment of the present invention.

FIG. 2 illustrates an exemplary process flow for monitoring a permit-based parking environment to determine if the vehicle(s) parked therein are permissibly parked. It is to be understood that the schematic representation provided in FIG. 2 is exemplary in nature and alternative arrangements are within the scope of the invention.

In step S1, a Reader 8 scans a vehicle parked in a permit-based parking zone managed by the PermitView System 1. The Reader 8 scans the vehicle to determine if it includes a parking permit having a valid RFID tag. One having ordinary skill in the art will appreciate that the permit may be in the form of a sticker affixed to the vehicle or an article hanging within the vehicle. The Reader 8 may be a stationary reader or, as described herein in accordance with an embodiment of the present invention, a handheld reader operated by a PEO. According to an embodiment of the present invention, the RFID Reader 8 is configured to detect and read a permit and corresponding RFID tag from a distance. In addition, one having ordinary skill in the art will appreciate that the Reader 8 may perform the scan while the Reader 8 is in motion.

In step S2, the Reader 8 determines if a RFID tag is detected. If no tag is detected, the Reader 8 and/or the PEO determines the reason for the failure to detect a tag, at step S3A.

During step S3A, if it is determined that the failure to detect a tag is due to an error by the reader operator, i.e., the PEO, the vehicle is scanned again, at step S1. If the failure to detect a tag is due to reader malfunction, the Reader 8 is repaired or replaced.

Alternatively, during step S3A, it may be determined that the failure to detect a tag is due to either a tag malfunction or the absence of a tag. In either case, in step S4, the PEO identifies information related to the parked vehicle under review, referred to as the "parked vehicle data," and enters the parked vehicle data into the Reader 8. The parked vehicle data may include, but is not limited to, the following information: 1) the make, model, year, and color of the vehicle; 2) the license plate number of the vehicle; 3) the location of the parked vehicle (e.g., the lot, street, and/or zone); and 4) the date, time, and day of the week of the scan. One having ordinary skill in the art will appreciate that the PEO may enter the parked vehicle data into the Reader 8 using any suitable input means, such as, for example, a keyboard, a keypad, and/or a voice recognition system.

The parked vehicle data is used to determine if a valid tag is associated with the scanned vehicle, in step S5. For example, if upon visual inspection of the vehicle the PEO determines that no permit/tag is present, or, there is a tag/permit present but the tag is malfunctioning, the license plate number of the vehicle may be looked up in the PermitView System 1 to determine if a valid tag is associated with the vehicle. If so, the PEO may issue a notice or warning to the permit holder concerning the holder's failure to properly display the permit/tag or permit malfunction, in step S5A. According to an embodiment of the present invention, the PermitView System 1 may track the number of such notices issued to a particular permit holder, and, if the number exceeds a certain threshold (i.e., three prior warnings), an appropriate enforcement action may be taken (e.g., the issuance of a citation or immobilization of the vehicle). An enforcement action may include, but is not limited to one or more of the following: 1) the issuance of a citation or summons; 2) the issuance of a notice or warning; 3) immobilization of the vehicle (i.e., booting) and/or 4) no action.

If during step S5 it is determined that no valid tag is associated with the parked vehicle, a determination is made as to the appropriate enforcement action, in step S8.

Alternatively, if during step S2 a tag is detected, the Reader 8 captures the unique RFID tag identifier, herein referred to as the "tag number," in step S3B, and identifies the parked vehicle data, in step S4. One having ordinary skill in the art will appreciate that the tag number may be any length string of alphanumeric characters capable of uniquely identifying the particular permit with which it is associated. According to an embodiment of the present invention, the tag number is stored on the RFID tag embedded in or attached to the permit.

Figure 3:
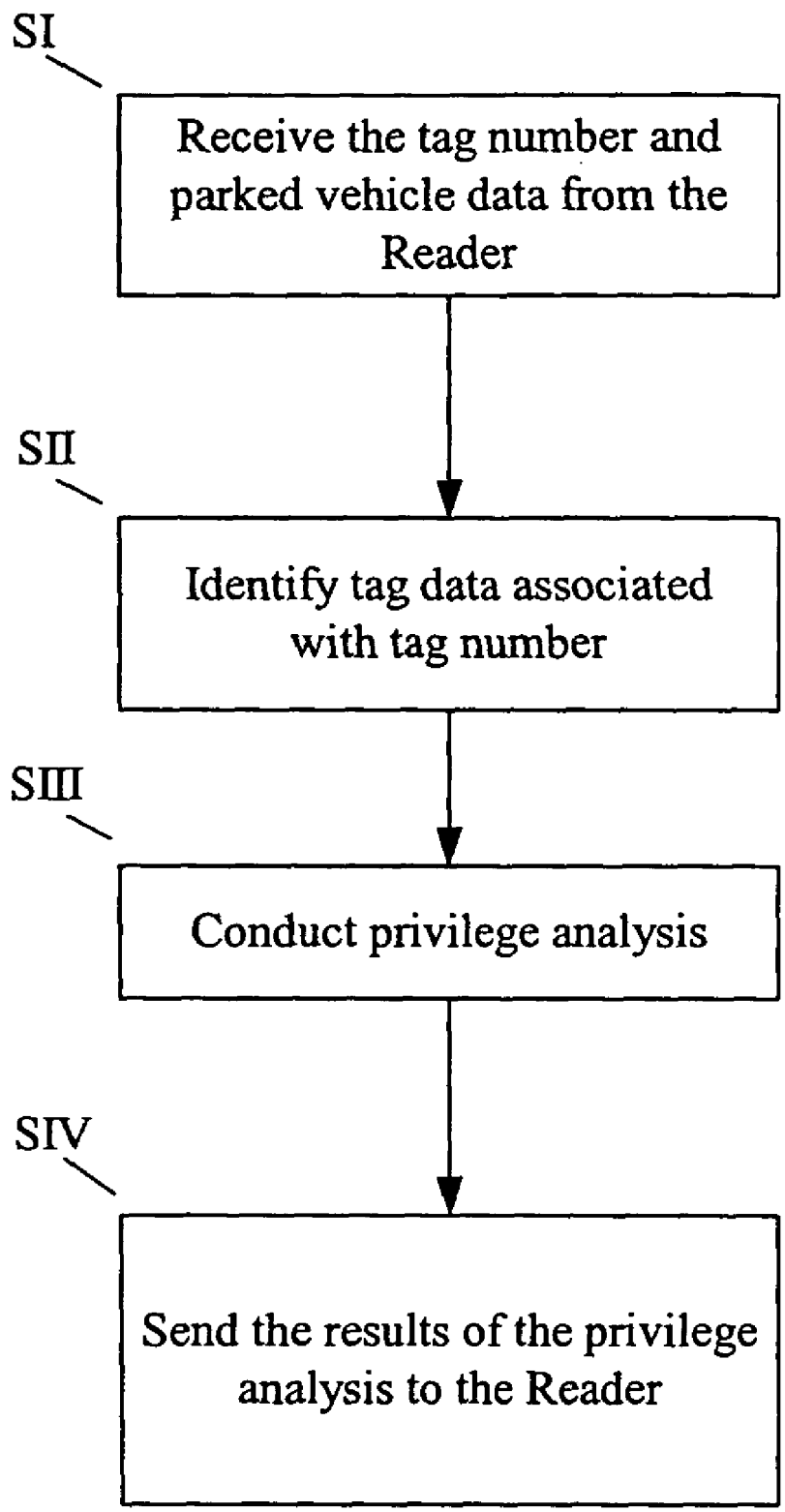
FIG. 3 illustrates an exemplary process performed by a permit management system, according to an embodiment of the present invention.

Having captured the RFID tag number and parked vehicle data, the Reader 8 sends this data to the PermitView System 1. FIG. 3 illustrates at least a portion of the steps of the permit management process performed by the PermitView System 1. As shown in FIG. 3, the PermitView System 1 receives the tag number and parked vehicle data from the Reader 8 via the User Interface 20, in step SI. The information is provided to the Privilege Module 40, which in turn retrieves the tag data associated with the tag number from the Permit Database 50, in step SII.

According to an embodiment of the present invention, the "tag data" includes, but is not limited to, the following information: 1) authorized vehicle data; 2) permit holder data; and/or 3) parking privilege data. The "authorized vehicle data" includes, but is not limited to the make, model, color, year, and/or license plate number of the vehicle or vehicles authorized under a valid permit. The "permit holder data" includes, but is not limited to, the permit holder's name, address, phone number, e-mail address, and/or facsimile number. The "parking privilege data" generally defines the scope of privileges or parking rights held by the permit holder, including, but not limited to: a) the one or more locations, zones, streets, lots, spaces, or areas the vehicle is permitted to park; b) the term of the permit and/or the permit's expiration date; and/or c) the valid parking time or times (i.e., weekend-only rights; weekday-only rights, seasonal rights, etc.).

In step SIII, the Privilege Module 40 conducts the privilege analysis, described in detail below with respect to FIG. 4. In step SIV, after conducting the privilege analysis, the Privilege Module 40 sends the results of the privilege analysis to the Reader 8.

Returning to the process illustrated in FIG. 2, in step S8, if it is determined that there is a violation based on the privilege analysis (see step S7) or, as described above, no valid tag is associated with the parked vehicle (see step S5), a determination is made as to the appropriate enforcement action to be taken. One having ordinary skill in the art will appreciate that the determination as to the appropriate enforcement action may be made by the PermitView System 1 (as part of the privilege analysis), the PEO, or by a parking program manager.

Figure 4:
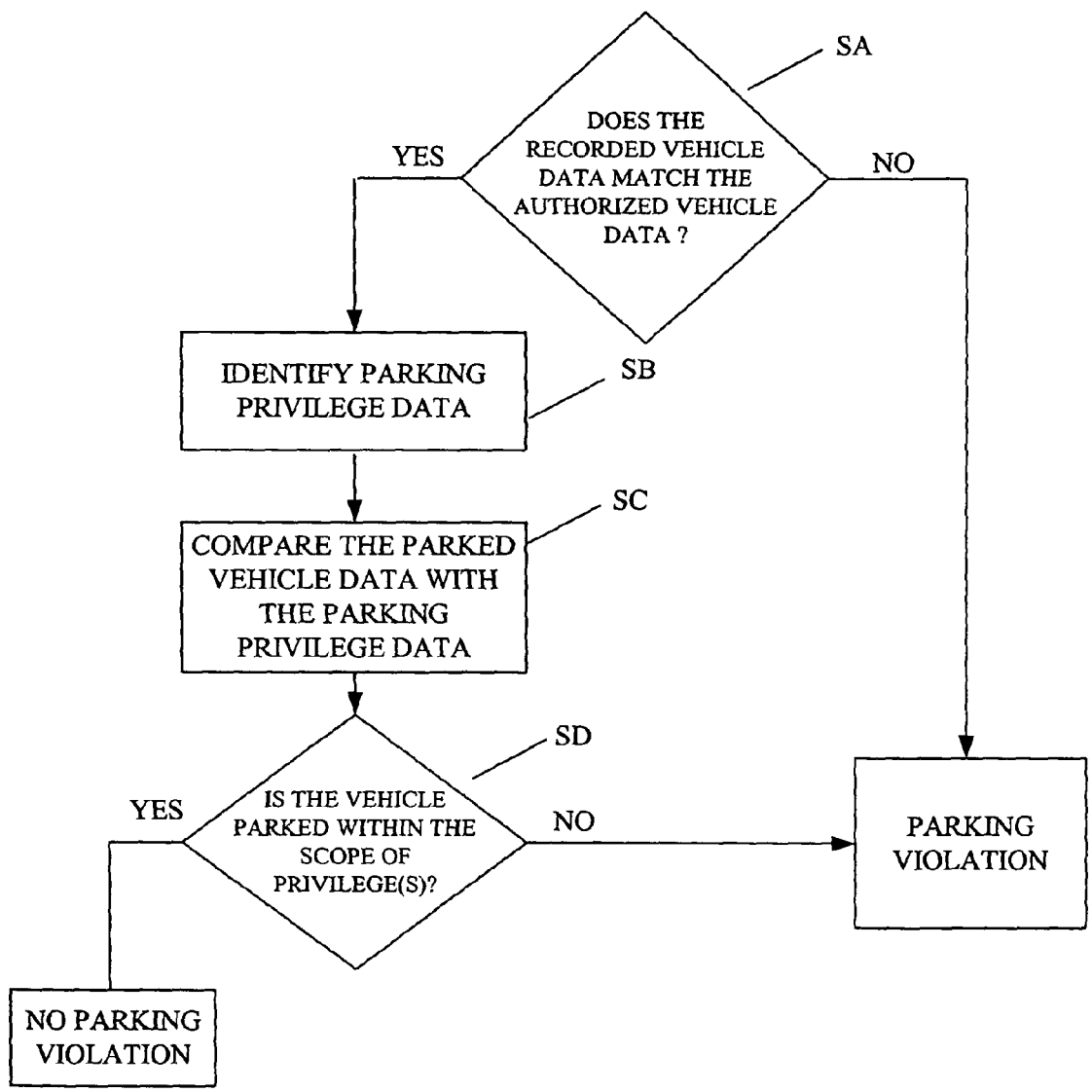
FIG. 4 illustrates steps according to an exemplary privilege analysis, according to an embodiment of the present invention.

FIG. 4 illustrates the steps involved in an exemplary privilege analysis, according to an embodiment of the present invention. Generally, the privilege analysis is performed by the PermitView System 1, and includes, but is not limited to, a comparison of the parked vehicle data to the parking privilege data associated with the permit assigned to the parked vehicle. In step SA, the Privilege Module 40 determines whether or not the parked vehicle data matches the authorized vehicle data associated with the scanned tag number in the Permit Database 50. If the data does not match, then there is a misuse of the parking permit, and a parking violation has occurred. For each parking violation that occurs, the Permit Database 50 stores information related to the parking violation, referred to as "parking violation data." The parking violation data may include, but is not limited to, the parked vehicle data (i.e., the information related to the violating vehicle); the vehicle owner's information (as derived from the license plate number), the PEO information, the type of enforcement action taken, etc. For example, a permit that has been stolen or illegally transferred to unauthorized vehicle will result in this type of mismatch, and corresponding parking violation. According to an embodiment of the present invention, if a misuse of the permit is detected, the Permit-View System 1 may place a temporary hold on the permit, thereby signaling to the PEO(s) that the permit is inactive or invalid.

Alternatively, the PermitView system 1 may communicate the authorized vehicle data associated with the scanned permit to the Reader 8. Then, based on a visual inspection of the vehicle, the PEO may determine whether or not there is a mismatch between the parked vehicle data and the authorized vehicle data.

If the data matches, the Privilege Module 40 identifies the parking privilege data (i.e., the scope of privileges) assigned to the permit, in step SB. According to an embodiment of the present invention, the parking privilege data may be defined in the parking program at the time of issuance of the permit, or at the time of a subsequent update or edit. For example, a permit holder, John Smith, may have a permit which includes parking privileges for zone "C"/Main Street, Hoboken, N.J./ Monday-Friday/between the hours of 6 PM and 7 AM. In addition, the same permit may also include privileges allowing John Smith, a student enrolled in summer classes at Rutgers University, to park his vehicle in campus parking lot "11"/zone "H"/spaces "19-27"/from June $1^{st}$ through August $15^{th}$. Collectively, these parking privileges make up the parking privilege data associated with John Smith's parking permit.

Referring to FIG. 4, in step SC, the Privilege Module 40 compares the parked vehicle data with the parking privilege data. Next, in step SD, a determination is made as to whether the vehicle is parked within the scope of the privileges. If not, then it is determined that a parking violation has occurred, and the parking violation data is recorded and stored in the Permit Database 50. One having ordinary skill in the art will appreciate that the parking violation determination may be made by the PermitView System 1, the PEO, or a parking program manager.

In the example set forth above, assume John Smith's vehicle is parked in parking lot 9/zone "B"/space 6 on June $17^{th}$. In step SC, this parked vehicle data is compared with the parking privilege data, resulting in a determination that a parking violation has occurred, in step SD. According to an embodiment of the present invention, the Privilege Module 40 communicates the results of the privilege analysis to the Reader 8 for the execution of an appropriate enforcement action. In addition, the parking violation data is stored in the Permit Database 50.

One having ordinary skill in the art will appreciate that the enforcement action may be executed in response to the detection of a parking violation and/or the identification of a scofflaw. A scofflaw is a person whose vehicle has a number of outstanding summons for parking violations which have been ignored. The number of outstanding violations to achieve scofflaw status may vary for different number of summons issued by summons issuing governing bodies such as for example, a municipality, a city, a university or a corporation. For example, a scofflaw may have two or more outstanding violations.

One exemplary enforcement action that may be executed by the parking management system is the administration of a fine (e.g., a monetary penalty). According to this embodiment, the parking management system includes a payment processing module that is configured to facilitate the payment of the fine (i.e., the remedial measure). The payment processing module may be a computer-based system and/or a human-based system which provides a vehicle owner/operator with a means for paying the outstanding fine.

Figure 5:
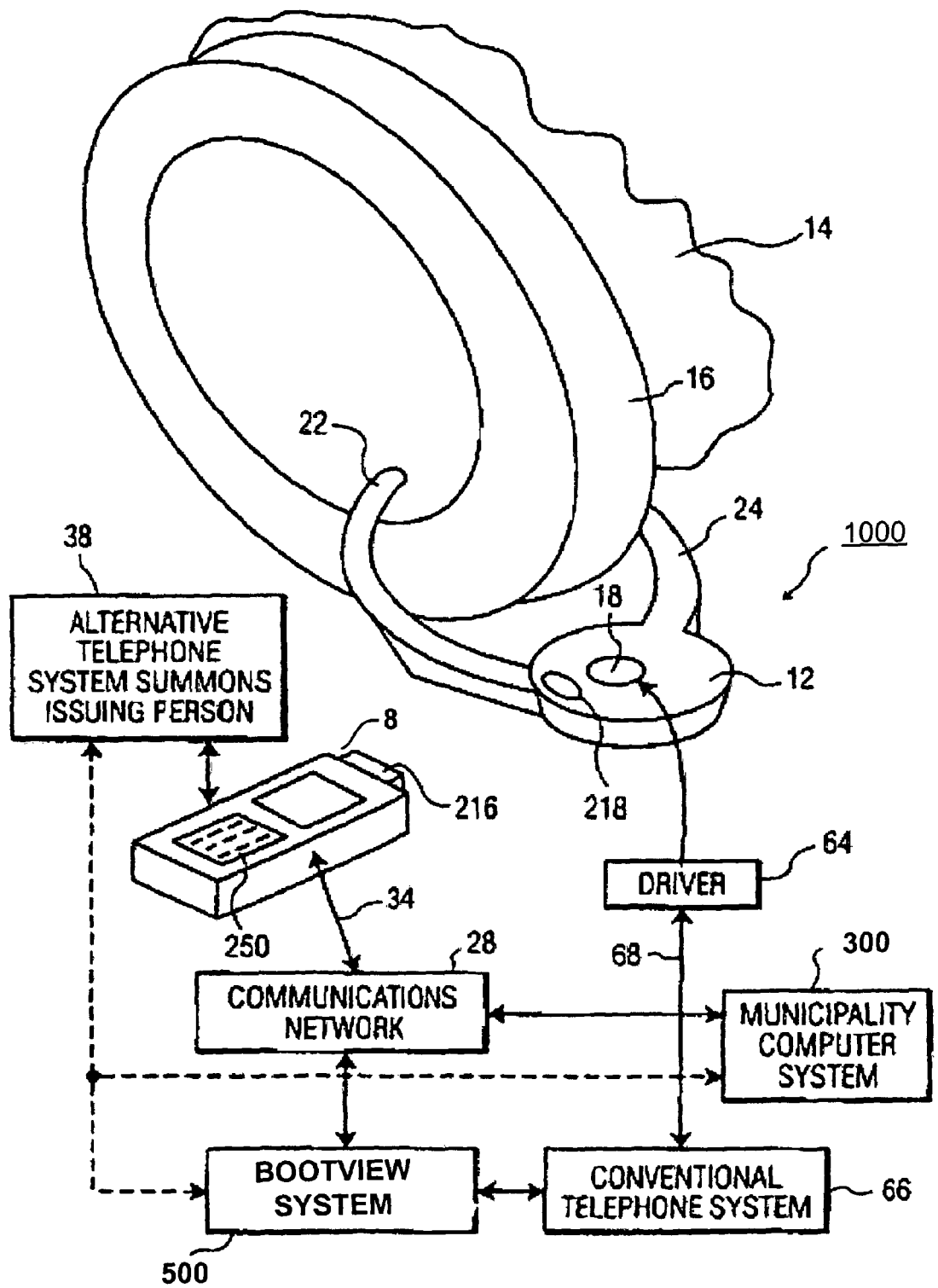
FIG. 5 is a schematic diagram showing a boot-based enforcement system, according to an embodiment of the present invention.

Another exemplary enforcement action includes the immobilization of the violating vehicle. According to this embodiment of the present invention, the enforcement module comprises a boot-based enforcement system 1000 configured to execute the immobilization of the vehicle. As shown in FIG. 5, the exemplary enforcement module comprises a boot-based enforcement system 1000 comprising a one or more vehicle wheel boots 12 used to immobilize a vehicle 14, one or more Readers 8 configured to communicate with the boot 12, and a boot management system 500 communicatively connected to the one or more Readers 8 and/or the plurality of boots 12 of the boot-based enforcement system 1000.

The boot 12 includes a combination lock 18 which may be unlocked by inserting an "unlock code," which may be a combination of characters (e.g., numbers, letters, symbols, etc.) whose serial arrangement is unique for each lock 18. Attached to the boot 12 by bonding or any other convenient attachment arrangement is a boot RFID tag 218. The boot RFID tag 218 operates at radio frequencies as known in this art and will be described below in greater detail in connection with FIG. 8. The boot 12 is preferably light weight to insure easy portability. According to an embodiment of the present invention, the boot 12 may have jaws 22, 24 which pivot open and closed about the wheel 16 in response to entering the appropriate combination into the lock 18. Typically the lock 18 is assigned a unique serial number and this serial number is the same as the unique ID code number assigned the boot RFID tag 218. Each boot RFID tag 218 of each of a plurality of boots has a unique ID in the tag memory corresponding to the unique serial number of the boot combination lock 18. Thus all boots used by the boot-based enforcement system 1000 are identifiable by their unique RFID code and the preferably identical associated serial number of the corresponding lock 18.

As described above, the Reader 8 may be a handheld device operated by a PEO, such as a PDA, or a stationary device. One having ordinary skill in the art will appreciate that the Readers 8 may be passive, active, or semi-active. The Reader 8 may include one or more software applications or programs (e.g., RFID/Barcode scanning software, citation writing software, etc.) configured to execute the functions performed the Readers 8, including, but not limited to, data capture, data storage, and scanning activity. Suitable Readers 8 for use with the present invention include, but are not limited to, the Symbol MC9000-G RFID device.

According to an embodiment of the invention, the boot management system 500, herein referred to as the "BootView" system 500, comprises a Boot Database 44, a payment processor, and a boot release module. The BootView system 500 may comprises one or more computers and/or human-based processing components configured to provides for the efficient administration and management of the boots 12 of the boot-based enforcement system 1000.

According to an embodiment of the present invention, each boot 12 included in the parking program includes a unique boot RFID tag identifier (e.g., a tag number), which is stored on the boot RFID tag 218 attached to or embedded in the boot 12 (e.g., in the form of an RFID chip). The boot RFID tag identifier is associated with information or data specifically related to that boot, including, but not limited to: 1) the code for locking the boot (i.e., the lock code); 2) the code for unlocking the boot (i.e., the unlock code); 3) the boot type/manufacturer; 4) serial number; 5) a default or override unlock code; 6) the currently active unlock code; 7) the location of the boot (i.e., location as tracked by GPS or other tracking system); 8) maintenance records; 9) diagnostic information such as battery level, accelerometer readings (i.e., for impact or shock), and/or temperature; and/or 10) current lock status (e.g., locked or unlocked), collectively referred to as the "boot data."

According to an embodiment of the present invention, the Boot Database 44 is any suitable computer-accessible memory or data storage device, which is configured to store the boot RFID tag identifier and associated boot data for each boot 12 managed by the parking program, to allow for the ongoing monitoring and management of the boot 12. When the boot 12 is scanned or read by the Reader 8, the Reader 8 communicates the boot data to the BootView system 500. The BootView system 500 communicates with the Boot Database 44 to retrieve any desired boot data stored thereon, such as, for example, the lock or unlock code, and communicates this information to the Reader 8.

For example, following detection of a parking violation, the PEO may scan a boot 12 using the Reader 8, determine the boot tag identifier, and communicate this information to the BootView system 500. Upon receipt of the boot tag identifier, the BootView system 500 may look up the boot tag identifier in the Boot Database 44, in order to retrieve the lock code associated with that boot. Next, the BootView system 500 communicates the lock code to the Reader 8 for use by the PEO in locking the boot 12, thus completing the execution of the immobilization of the vehicle. One having ordinary skill in the art will appreciate that a similar process is followed when facilitating the performance of the release of the boot 12, wherein the Boot Database 44 provides the unlock code to the BootView system 500 for transmission to the Reader 8.

According to an embodiment of the present invention, the boot 12 may include a GPS receiver which allows the location of the boot 12 to be determined by a GPS system or other tracking system. The BootView system 500 may be communicatively connected to the GPS system to allows the BootView system 500 to identify the location of each of the boots 12 of the boot-based enforcement system 1000. Optionally, the location of the boot 12 may be transmitted to the BootView system 500 directly from the boot 12 via a pager signal over a pager network.

According to an embodiment of the present invention, if the boot 12 is not communicatively connected to the BootView system 500 via a pager network (as described in detail below), the boot 12 may be configured to cycle through and change its unlock code periodically according to a predefined, yet predictable algorithm. The algorithm is known maintained by the BootView system 500 thereby allowing the system to determine the current unlock code without any direct communication with the boot 12.

According to an embodiment of the present invention, the BootView system 500 may be communicatively connected to the boots 12 of the boot-based enforcement system 1000 via any suitable communication means, such as, for example, via a conventional telephone system 66 (shown in FIG. 5).

According to an embodiment of the present invention, the Reader 8 includes an RFID interrogator 216. The interrogator 216 communicates via a communications network 28 to the BootView system 500 or other governing body traffic scofflaw data base. The RFID interrogator 216 of the Reader 8 also communicates with the boot RFID tag 218 of the boot 12, as shown in FIG. 8.

Figure 8:
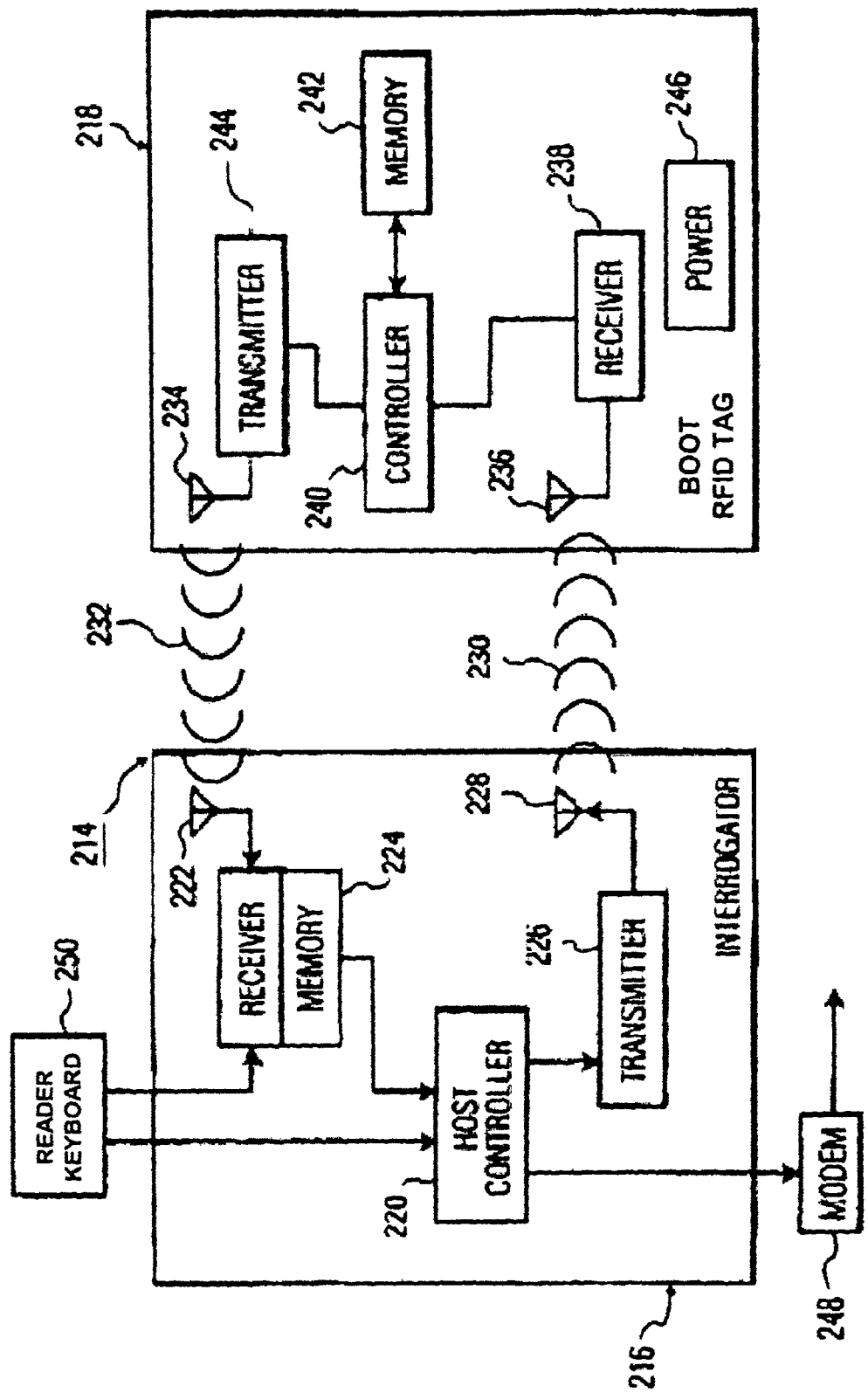
FIG. 8 is a block schematic diagram of an RFID interrogation reader-transmitter and tag system, according to an embodiment of the present invention.

Referring to FIG. 8, the RFID system 214 includes an interrogator 216 and a boot RFID tag 218. The interrogator 216 includes a host controller 220 to process received information from the boot RFID tag 218 via receiver/memory 224 and antenna 222 and from the keyboard 250 (or other input device) of the Reader 8. A separate memory (not shown) may be included in the host controller for receiving and storing the keyboard inputted data separate from the tag inputted data.

Figure 7:
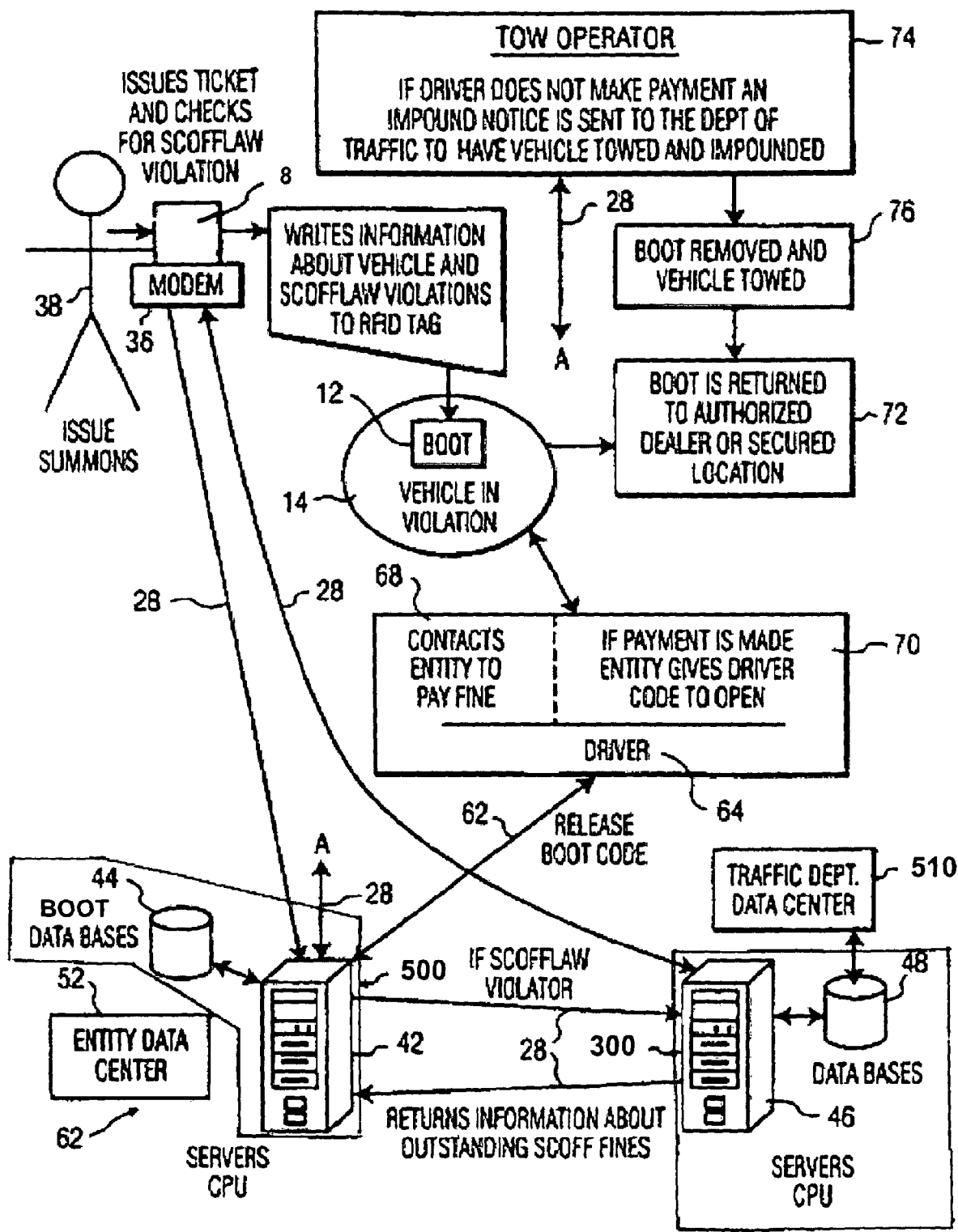
FIG. 7 is a depiction of a boot-based enforcement system, according to an embodiment of the present invention.

In FIG. 8, the antenna 222 also may receive data via a communication network 28, as shown in FIG. 5, or from other sources, such as, for example, a municipality traffic violation computer system 300. The scofflaw data may also be communicated directly to the BootView system 500 from the municipality computer system 300 via network 28 or from a Reader 8 communication modem 36, as shown in FIG. 7, using a communication link to network 28 according to an embodiment of the present invention. The network 28 may include the internet, a local area network (LAN) or the intranet among others (not shown). Optionally, the BootView system 500 and the municipality computer system 300 may integrated and maintained on the same computer or computers.

The PEO may receive and communicate the scofflaw data from the municipal computer system 300 to the Reader 8 via the modem 36 and network 28, to the boot RFID tag 218 using an RFID interrogator transmitter, described in detail below, and to the BootView system 500 via a telephone system such as a cell phone (not shown).

In FIG. 8, the RFID system includes an interrogator 214 which further includes host controller 220 which generates an interrogation command signal which is transmitted by transmitter 226 and antenna 228 as signal 230. The controller 220 also transmits scofflaw data, and other information in the Reader memory entered by the summons issuing person via antenna 228, the keyboard 250, or a separate antenna as may be needed.

Figure 6:
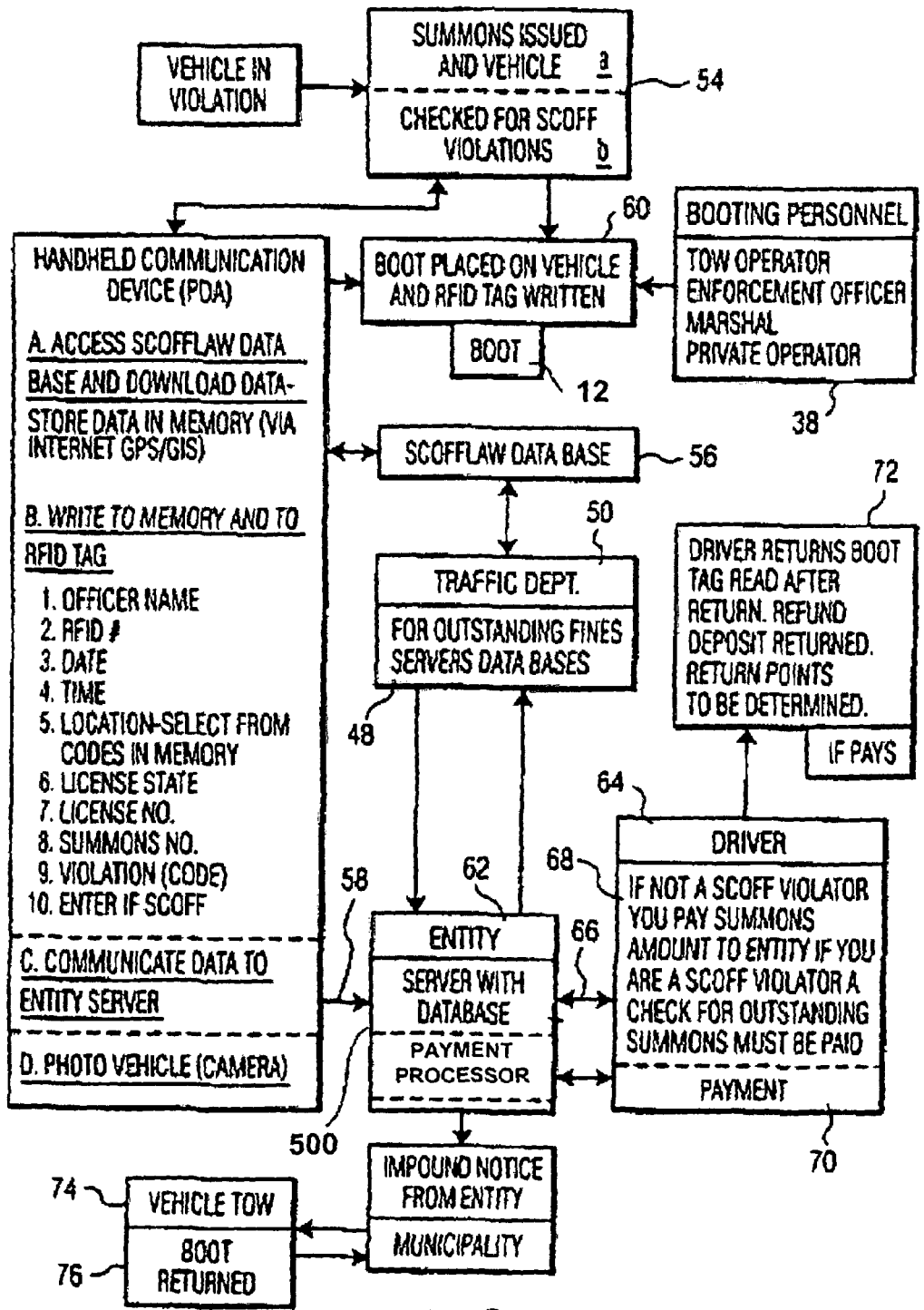
FIG. 6 is a diagrammatic illustration of a boot-based enforcement system, according to an embodiment of the present invention.

The data entered into the Reader 8 via the keyboard 250, as shown in FIG. 8, by the PEO 38, see FIGS. 5 and 7, includes data shown in FIG. 6, such as, for example, the name of the PEO or municipal officer, the RFID unique tag number, the date, time and location of the summons, the location may be selected from memory as stored codes for cities, municipalities and so on, the license number and registration state of the vehicle, the summons number, the violation code and scofflaw indicator which indicates the violator is a scofflaw.

According to an embodiment of the present invention, the location may also be determined by a GPS receiver located in the Reader 8. The data, such as, for example, the location of the Reader 8, the receiver system installed, license information, PEO information (which may be entered by a scanner from an officer ID card in some instances when available) may be entered in part via the keyboard 250. Optionally, if the Reader 8 includes a GPS receiver, the location data may be obtained via a GPS tracking system. The BootView system 500 may provide scofflaw data (i.e., a license plate number; make, model, and year of scofflaw vehicle; name and address of individual having outstanding parking tickets) may be entered automatically into the Readers 8 via a modem or other communications device via the network 28, as shown in FIG. 5.

For those Readers 8 without a modem or equivalent communication device, communication with the BootView system 500 and/or the municipality computer system 300 may be made manually by cell phone or other telephone or communication device via a telephone system 66 and then the various data received from personnel at the host and municipality locations entered manually via the keyboard 250.

Referring to FIG. 8, the boot RFID tag 218 includes a receiving antenna 236 coupled to a controller 240 via a receiver 238, memory 242 coupled to the controller 240 which extracts appropriate data upon receipt of the signal 230, and a transmitter 244 for transmitting information in the memory 242 via transmitting antenna 234. The interrogator 216 can selectively transmit an interrogation signal and/or first information to the tag which may include violation data such as a violation code, a summons number, a date and time stamp, a location, a license number, and other data entered into the Reader 8 The boot RFID tag 218 transmits the RFID signal 232 containing second information in response to receipt of an interrogation signal from the interrogator 216 antenna 228 to antenna 236. This second information includes the tag ID and the pertinent violation data which is transmitted to interrogator 216 via boot RFID tag 218 antenna 234 to the interrogator antenna 222. The signal 232 manifests the RFID identification number and also violation data that may be stored in the memory 242. Such violation data may be received from the interrogator 216 under the control of controller 220 and stored in the Reader memory (not shown) as previously entered, manually and/or also electronically from scofflaw data downloaded from the BootView system 500 or the municipality computer system 300. This data is transmitted by transmitter 226 under control of controller 220. The keyboard 250 may include keys for controlling the mode of operation of the controller 220 as to issuing an interrogation command signal 230 or first information violation data transmission signal 230 to be stored in the boot RFID tag 218, as the case may be. The received violation data and the RFID unique number is stored in memory 242 under control of controller 240 and released from memory and transmitted to antenna 234 in response to a control signal received by controller 240 via antenna 236 and signal 230.

To retrieve information from the tag, the host controller 220 generates an interrogation signal 230 upon command from the keyboard 250 or by a signal received thereby and which signal 230 is transmitted by transmitter 226 and antenna 228 as signal 230 to the boot RFID tag 218 receiving antenna 236.

The boot RFID tag 218 may be affixed to the boot 12 in any convenient location by any suitable attachment arrangement. Such an arrangement may include bonding, fixation in a radio transparent housing which is permanently secured to the boot exterior, secured in an internal boot cavity but exposed in a radiation transparent housing for reception and transmission of radio signals from and to the interrogator and so on. An interrogator may also be included in the BootView system 500 and/or the municipality computer system 300 for communicating with the boot RFID tag 218.

In FIG. 5, the handheld RFID Reader 8 is used to scan the boot RFID tag 218. The interrogator 216 logs in its memory the scanned information the unique ID of the tag and the date/time stamp. The remainder of the data required as listed above and as shown in FIG. 6 is entered as described above. The Reader 8 is used, if equipped with a communication modem, to contact the municipality computer system 300 to retrieve scofflaw data which if present, is entered into the Reader memory. The Reader 8 is then used to transmit this information stored in the Reader 8 to the BootView system 500 and any associated database.

Any commercially known RFID interrogator 216 and the boot RFID tag 218 can be used in the Reader 8 and boot 12, and if necessary, modified as described above. Also, one having ordinary skill in the art will appreciate that a known Reader 8 may be adapted to include an RFID interrogator 216, such as the TEK protégé RFID adapter. Preferably an employee identification card is included for use by the summons issuer for scanning into the Reader 8 his or her employee number.

The Reader 8 using the network 28 uploads the violation data stored in the Reader 8 including the tag ID and so on to the BootView system 500.

According to an embodiment of the present invention, as shown in FIG. 7, the BootView system 500 includes one or more computers or servers 42 comprising CPUs, memory, and one or more databases 44. According to an embodiment of the present invention, the municipality computer system 300 may comprise one or more computers or servers 46 and one or more databases 48. Optionally, the BootView system 500 and/or the municipality system 300 may include or be communicatively connected to a traffic department data center 510 which includes scofflaw data stored therein and which is included in the databases 48 of the municipality system 300.

While the BootView system 500 and the municipality computer system 300 are described as computers or servers which include high speed hard drives, fast microprocessors and large memories, conventional PCs may be used in the alternative. Such systems also include printers (not shown) for printing out the necessary data.

The BootView system 500 or the municipality system 300 can operate as set up systems for setting up the Readers 8 and tags with the appropriate data such as location codes in the Reader 8, serial nos. and RFID tag numbers for the tags and so on for use in the boot-based enforcement system 1000. The Readers 8 may also have jacks for attachment to the BootView system 500 and municipality system 300 for downloading necessary set up information data and implemented with known devices (e.g., file transfer server protocols). The storage devices used in the boot-based enforcement system 1000 may be implemented using various data formats as known in this art (e.g., relational databases). The storage memories may be part of the computer systems or implemented with separate devices. Access to the stored data may be by using Microsoft Access or other suitable databases. The BootView system 500 and the municipality system 300 servers may be located in the same location as the storage devices of the respective systems. Communication there between is conventional. The network 28 may be wireless or wired and may be any known system including those noted above. Printers may be at the same locations as the servers or different locations and coupled by known communication systems.

In operation, a PEO or summons issuer 38, as shown in FIGS. 5 and 7, issues a parking summons to a vehicle in violation of a parking law, at step 54a of FIG. 6. The PEO 38, using the Reader 8, communicates via the network 28 (see FIG. 5) or via the telephone system 400, with the municipality computer system databases 48 (see FIG. 7), to learn if the vehicle has prior outstanding violations, i.e., is a scofflaw, as shown in step 54b of FIG. 6. This information is automatically downloaded to the Reader 8 via the network 28 or entered manually if by telephone, in step 56 of FIG. 6.

According to an embodiment of the present invention, the municipality computer system 300 may be maintained by a governing body, and includes the database 48 of scofflaw data. The municipality computer system 300 may also include a memory card reader/writer (not shown) associated with the database 48 for copying scofflaw data to a memory card associated with the reader/writer. The card is used to transfer the scofflaw data from the database 48 to the Reader 8. Such cards, referred to as compact flash memory card, secure data (SD) card, etc., are relatively small, but have relatively large memory capacity (e.g., 16, 64, 128 or 256 megabytes memory capacity), commonly. Such card readers, commonly used with digital cameras and other electronic systems, are widely available. The Reader 8 also has such a card reader (not shown) for transferring scofflaw data entered onto the card from the database 43 of the municipality computer system 300, shown in FIG. 7, into its memory.

If the vehicle has outstanding violations associated with it, the PEO 38 then enters the data, as shown in FIG. 6 and described above, into the Reader 8 via the keyboard and by the network 28, if available. The issuer then attaches the boot 12 to the vehicle wheel 16, as shown in step 60 of FIG. 6.

According to an embodiment of the present invention, the boot RFID tag 218 is embedded in the boot 12, and includes a unique ID code number which preferably corresponds to the serial number of the boot 12. At the same time, the tag ID and corresponding combination of the boot lock 18 may be stored in the database 44 communicatively connected to the BootView system 500, as shown in FIG. 7. This tag ID is correlated in the database 44 with the corresponding combination code to unlock the boot 12 associated with that unique tag ID.

In FIG. 6, the issuer then communicates with the tag to upload the tag ID and then with the BootView system 500 at step 58. At this time the Reader is used to upload the violation data including the RFID unique code, the date and time of violation, the scofflaw information manifesting if the violator is a scofflaw and to optionally including the total fines attributed to the outstanding violations, optionally also uploaded can be the vehicle make, the vehicle license number, state of registration, the summons number and the violation code via the network 28 or by telephone, if the Reader 8 does not have a modem or communication device for communicating with the network 28. This violation data is also transmitted to the boot RFID tag 218 via the interrogator 216, as shown in step 60 of FIG. 6.

The boot-based enforcement system 1000 may serve as the resolution module of the parking management system. The boot-based enforcement system 1000 assists the vehicle owner/operator in performing the appropriate remedial measure which may include, but is not limited to, the payment of any outstanding fine, the removal of the boot 12 from the vehicle, and/or the return of the boot 12 to an appropriate location.

According to an embodiment of the present invention, the resolution module is a computer-based system and/or a human-based system comprising a payment processor configured to communicate with the vehicle owner/operator and process payment of a fine associated with a parking violation, a release processor configured to transmit an unlock code to an immobilization device (e.g., boot 12), and a return processor configured to communicate return instructions to the user.

In order to facilitate the performance of the removal of the boot, the PEO 38 may provide information related to removal of the boot 12 (i.e., instructions for the performance of the remedial measure), namely, the contact information (e.g., telephone number of the entity controlling the BootView system 500, to the vehicle owner/operator. According to an embodiment of the present invention, the vehicle owner/operator may contact the entity 62 via a conventional telephone system 66, as shown in FIGS. 5, 6 and 7, or other suitable means of communication.

The entity 62 is given the summons number (which also may be the boot serial number) by the owner/operator 64. Using this information, the entity 62 looks up in its computer system database the tag ID as communicated to it previously by the PEO 38 (i.e., via the Reader 8, in person, or by telephone). These events may occur within a number of minutes or hours of each other as typically the boot will be attached before the owner/operator returns to the vehicle. Once the entity has the tag ID it also has the associated scofflaw data and fine information.

In the alternative, the entity may contact the municipality database 48 to obtain the fine information, which is more time consuming and not as desirable as having the fine information immediately available. The entity may use the BootView system 500 and/or associated databases 44 to correlate scofflaw data with fine data to determine the fine due for any number of outstanding summons. However, preferably, this data is provided by the Reader 8 as downloaded directly from the municipality system 300, as shown in FIG. 5, or as communicated directly to the BootView system 500 by telephone from the summons issuer.

As described above, one exemplary remedial measure facilitated by the boot-based management system 1000 is the payment of a fine. According to an embodiment of the present invention, the BootView system 500 comprises a payment processor which is configured to facilitate payment of the fine by the owner/operator. The payment processor may be communicatively connected to a communications network which allows the vehicle owner/operator to authorize payment of the fine by telephone by providing his or her credit card number or other payment information (e.g., a debit card number), at step 70 of FIG. 6. The remedial measure may include the payment of a deposit for the boot 12, to insure the owner/operator returns the boot 12 to the entity. Upon performance of the appropriate remedial measure (i.e., payment of the outstanding fine), the entity may provide the owner/operator with the code required to unlock the boot 12. The unlock code may be provided via any suitable means of communications, such as, for example, via telephone. In addition, other remedial measure information may be provided to the owner/operator, such as, for example, an address to which the boot 12 may be returned following removal from the vehicle.

According to an embodiment of the present invention, the release and/or removal of the boot may be facilitated by allowing the user to provide the appropriate payment using electronic or card-based payment methods. For example, the user may pay for the release of the boot using a conventional gas-station issued card, such as an Exxon/Mobil Speedpass™ card.

In step 72, when the boot 12 is returned to the appropriate entity, agent, dealer, etc., the boot tag is read to verify that the boot being returned matches the boot information associated with the owner/operator data received from the PEO. If there is a match, the deposit is returned to the owner/operator. Advantageously, the entire resolution process (i.e., the release of the boot) may occur in a relative short period of time. In addition, the return of the boot may be performed at the convenience of the owner/operator.

In the event the owner/operator elects not to pay and fails to contact the entity, the entity may send an impound notice to the municipality issuing the summons. The term "municipality' is intended to include any governing body that institutes a parking program.

According to an embodiment of the present invention, the municipality may contact a towing service via telephone, in step 74, for towing the violation vehicle to an impound site. To tow the vehicle, the tow operator needs to remove the boot, in step 76. The tow operator communicates with the entity system 32 (e.g., via telephone) to obtain the required combination to unlock the boot, in step 74. According to an embodiment of the present invention, the tow operator may use a Reader 8 to obtain the boot tag ID and related violation data and to communicate this information to either the entity or to the municipality via the network 28 or by telephone to obtain the unlock combination for the boot. The tow operator then removes the boot and tows the vehicle to an impound site, in step 76, and the boot is returned, in step 72.

According to an embodiment of the present invention, the boot release code may be a scrolling number to prevent distribution of boot release codes indiscriminately. That is, the codes may be assigned as random numbers to each boot. When so assigned the numbers are then entered into the appropriate host and municipality data bases wherein control of the boots is initially maintained. If the boots are distributed by the municipality, then it assigns the release codes to each boot, records the release code and boot tag Ids, and transmits the codes to the entity with correspondence to the unique tag IDs associated with each boot. The boots preferably have a master override key to release the boot in case of technological failure of the release code.

The Reader 8 may include a software program configured to read the scofflaw data stored in a database of the municipality computer system. The Reader 8 may include a connector for mating with a receptacle in which such data can be transferred using control circuitry at the municipality computer system 300. Additionally, the municipality system 300 may also include a system in the alternative for reading scofflaw data directly into the boot tag without a need for the Reader 8 to do so. This direct input of data into the tag memory at the municipality computer system eliminates possible error in the communication system transmission of such data via the Reader to the tag.

It will occur to one of ordinary skill that the disclosed embodiments are given by way of example, and that modifications may be made to the disclosed systems. For example, the Reader 8 may include a digital camera whose data may also be communicated by the Reader 8 to the boot RFID tag 218, and to the BootView system 500 and/or to the municipality computer system 300. The disclosed embodiments are given by way of example and not limitation. It is intended that the invention is defined by the appended claims and not by the disclosed embodiments.

According to an embodiment of the present invention, an alphanumeric pager network may be used for two-way communication between the boot 12 and the entity host computer system 62. Using the pager network, the entity host computer system 62 unlock the boot 12 remotely by transmitting the appropriate unlock code to the boot 12.

According to an embodiment of the present invention, the pager network may be used to communicate new unlock codes from the boot 12 to the entity host computer system 62. According to this embodiment, the boot 12 may be equipped with an unlock code generator which periodically generates an unlock code when successfully locked. The boot 12 transmits the unlock code to the entity host computer system 62 via the pager network. In the event the transmission is unsuccessful, the code generator detects the transmission failure and defaults to a failsafe unlock mechanism, which may be a manual override (i.e., unlocking using a key) or a default unlock code. Alternatively, upon successful locking of the boot 12, the BootView system 500 may generate an unlock code and transmit the code to the boot 12.

According to an embodiment of the present invention, the boot-based enforcement system 1000 may include one or more boot docking stations configured to dock the one or more boots. The boot docking stations may be communicatively connected to the BootView System 500 and the PermitView system 1.

The boot docking stations may be configured to perform one or more of the following actions: 1) recharge the power supply of the boot 12, 2) transmit usage and diagnostic data to the BootView system 500; 3) reprogram firmware stored in the boot 12; 4) communicate software updates from the BootView system 500 to the boot 12; 5) update or change lock and unlock codes; and 6) print boot return/payment receipts.

The boot docking station may be communicatively connected to the boots via suitable communications and connections means, such as, for example, a USB connection, Firewire, an Ethernet connection, a wireless connection (e.g., Bluetooth or WiFi connections), etc. Optionally, the boot docking station may use a power-over-ethernet connection to recharge the power supply (e.g., batteries) of the boot 12. The boot docking station may be protected from external factors such as weather, vandalism, and hacking.

According to an embodiment of the invention, the one or more "return" locations may include locker-style boot docking station which is adapted to house and dock a plurality of boots 12.

According to an embodiment of the present invention, the PermitView System 1 may be accessed by both existing and prospective permit holders via the permit holder/applicant portal of the User Interface 20. The User Interface 20 may include an authentication or login screen which prompts existing permit holders to provide login information (e.g., a username and password). One having ordinary skill in the art will appreciate that any suitable authentication system or method may be used in accordance with the present invention, such as, for example, ASP.Net WebForms-based authentication. A permit holder may access information related to his or her account, and perform a number of account-related tasks, including, but not limited to the following: 1) add/edit/delete/update the authorized vehicle data; 2) add/edit/delete/update the permit data; 3) add/edit/delete/update permit holder data; 4) make bill, renewal, and/or citation payments; and 5) review account information including previously issued warnings/notices and/or citations; etc.

According to an embodiment of the present invention, a person may access the PermitView System 1 to submit a new permit application. The new permit application may include, but is not limited to, the permit holder data, the vehicle or vehicles associated with the permit, the requested scope of privileges, a means for payment, and/or the proof required for the issuance of a permit. The proof required to obtain a permit may include, but is not limited to proof of residency or eligibility for residential parking privileges (e.g., a utility bill, a owner/operator's license, a real estate tax bill, etc.), proof of employment for employee parking privileges, proof of matriculation for student parking privileges, proof of personal identification (e.g., a owner/operator license, social security card, etc.). According to an embodiment of the invention, this information may be electronically scanned and transmitted to the PermitView System 1 in any suitable file format, such as, for example, a Portable Document Format (PDF).

One having ordinary skill in the art will appreciate that an inventory of available and/or issued permits may be managed, stored, and maintained by the PermitView System 1 in a database, such as, for example, the Permit Database 40. Alternatively, the inventory may be stored in a separate database, referred to as Inventory Database 7B in FIG. 1, managed and maintained by the parking program manager, via the Parking Manager Computer 7. According to this embodiment, new applications may be received by the PermitView System 1 and communicated to the Parking Manager Computer 7 for review and evaluation.

According to an embodiment of the present invention, a PermitView administrator may access the PermitView System 1 via the PermitView administrator portal of the User Interface 20. Preferably, an increased or relatively higher level of authentication is required for access via the administrator portal due to the type and amount of access the administrator has to the PermitView System 1.

According to an embodiment of the present invention, the one or more administrators may access the PermitView System 1 to perform a number of functions, including, but not limited to: 1) setting up and administering new parking programs; 2) providing online support; 3) managing user groups; 4) setting parking privilege data in accordance with the parameters of the parking program; 5) managing permit inventory; 6) processing new permit applications; 7) managing warning/notice and citation issuance; 8) defining and providing reports to the user groups; and 9) management of billing and invoicing processes.

According to an embodiment of the present invention, a parking program manager may access the PermitView System 1 via the parking program manager portal of the User Interface 20. As compared to the other user groups, the parking program managers require a unique level and type of access to the PermitView System 1. According to an embodiment of the present invention, the one or more administrators may access the PermitView System 1 to perform a number of functions, including, but not limited to: 1) running a variety of reports related to the parking program; 2) setting up and administering new parking programs; 3) updating/editing existing permit holder data; 4) managing permit inventory; and 5) tracking enforcement action information.

Figure 9:
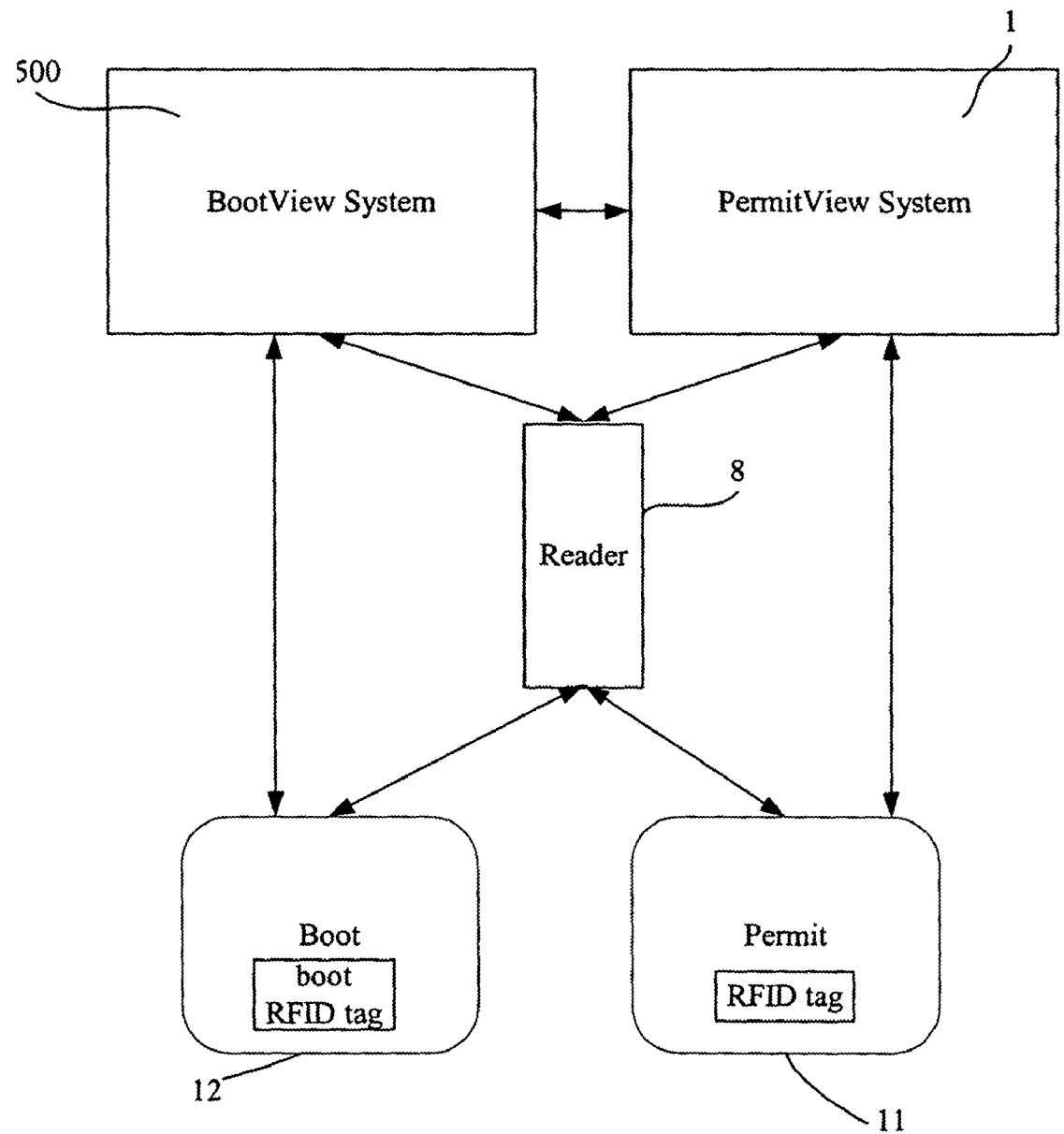
FIG. 9 is an illustration of a parking management system, according to an embodiment of the present invention.

FIG. 9 illustrates the parking management system for managing a boot-based and permit-based parking environment, described in detail above, comprising the BootView system 500, the PermitView system 1, a plurality of boots 12 each having a boot RFID tag, a plurality of permits each having a RFID tag, and a plurality or Readers 8 for communicating and reading the RFID tags associated with the boots 12 and the permits 11.

According to an embodiment of the present invention, the PermitView System 1 may be used to a manage a multi-space "pay-to-park" program and/or environment. Conventional pay-to-park programs generally allow an individual to pay for parking in a particular parking space, area, or zone for a desired allotment of time. Typically, the individual makes the payment via a "multi-space" or "pay and display" parking meter or machine by cash, credit card, or debit card, at the meter itself. Alternatively, the individual may make payment via a telephone communication to an established "pay by phone" or "park by phone" system. Generally, following payment, the individual prints out a "receipt" or proof of the purchase, and returns to his or her vehicle to affix the receipt to the vehicle, typically in a place viewable from the exterior of the vehicle, such as, the dashboard or windshield.

To enforce these programs according to conventional systems, information related to the vehicles that are parked legitimately (i.e., information identifying those vehicles for which payment has been made and for which the block of time has not expired) is collected into a "legitimately parked vehicle list," which is provided to a PEO, typically via a wireless communication to the PEO's handheld ticket writing device, or more commonly, via a "report" which the PEO may access and print via the parking meter by entering a special code into the meter.

Next, the PEO, via a visual inspection, compares the legitimately parked vehicle list with the cars physically parked in a given zone, and takes an appropriate enforcement action (e.g., issue a ticket) against vehicles parked in a parking space which is not listed in the report.

Furthermore, conventional "multi-space" parking meter systems and programs typically require a motorist to walk to the multi space parking meter associated with the parking lot, typically arranged with one meter per lot, to purchase parking time via cash, credit or debit card. Parking lots using "multi-space" meters are required to visually mark each parking space with an identifier (e.g., a number and/or letter designation), either by printing the identifier on the pavement, ground or sidewalk at or near each individual parking space in manner which clearly identifies each parking space in the lot. As such, the motorist is required to remember the identifier and accurately enter the identifier into the "multi space" parking meter in order to purchase time for that particular parking space.

According to an embodiment of the present invention, payment for a parking space in a pay-to-park environment may be executed by the individual using a payment means such as an account number or smart card associated with his or her permit 11. This allows the individual to purchase time from the multi-space meter, either at the meter itself, or via a pay by phone system. In the case of "multi-space" meters, due to the association of the payment method and the permit 11 associated with the vehicle (i.e., associated with the vehicle in the PermitView System 1 and attached or displayed by the vehicle), the individual may make the payment without having to note or remember the parking space identifier of the space the he or she has parked. According to an embodiment of the present invention, the individual may avoid interaction with the meter by processing a payment via a park by phone system, having the information related to the transaction processed by the PermitView System 1 and associated with his or her permit 11, and communicated by the PermitView System 1 to the appropriate PEO.

According to an embodiment of the present invention, in the case of "pay and display" meters, the individual does not have to return to his or her vehicle to place the receipt on the vehicle dashboard. This allows for added convenience for the individual while providing an enhanced method of enforcement for the enforcing authority.

According to an embodiment of the present invention, the PermitView System 1 facilitates enforcement of the pay and display, park by phone, and pay by phone parking environments. Specifically, the legitimately parked list may be provided by the PermitView System 1 to the Reader 8 directly. Alternatively, the PermitView System 1 may provide the legitimately parked list to the multi-space meter or pay and display meter, which is communicatively connected to the Reader 8, via, for example, a wireless connection. Advantageously, processing of the legitimately parked list according to an embodiment of the present invention eliminates the need for the PEO to interact with the meter to generate and obtain the report and further eliminates the need to visually inspect the spaces absent from the report to determine if an enforcement action is required. Instead, the Reader 8 may receive the legitimately parked list from the PermitView System 1, scan the permit(s) 11 of the vehicles parked in the environment, capture the tag data associated with the permit 11, and compare the tag data with the legitimately parked list to determine if an enforcement action is required.

According to an embodiment of the present invention, payment for the space may be executed by the individual using an account number or smart card associated with his or her permit 11. Upon payment, data related to the pay-to-park transaction, referred to as "pay-to-park data" is associated with the his or her permit 11 and unique RFID tag identifier in the PermitView System 1. The pay-to-park data may include, but is not limited to, the time and date of the purchase, the amount of parking time purchased, an authorization to automatically charge an account for an extension of the parking time, information identifying the permit 11 associated with the parked vehicle, and a "virtual meter," (i.e., a virtual clock which runs from the time of payment authorization for the period of time selected and paid for by the individual).

The pay-to-park data is associated with the permit 11 in the PermitView System 1, which prepares a legitimately parked list and provides the list to the Reader 8, for consideration by the PEO. The PEO may scan the permits 11 in a pay-to-park environment with the Reader 8, which automatically checks the tag data associated with the scanned permit 11 against the legitimately parked list received from the PermitView System 1, thereby eliminating the need for the PEO to conduct a visual inspection in order to detect a parking violation.

According to an embodiment of the present invention, when an individual attempts to process payment of a parking space in a pay-to-park environment, the PermitView System 1 may determine that the individual is on a scofflaw list. According to an embodiment of the present invention, the scofflaw list may be provided by one or more sources, such as a municipality or other government entity. The scofflaw list may include information identifying each individual having outstanding parking violations who have been assigned a "prohibited status," meaning the individual is prohibited from parking in the one or more zones governed by a parking program managed by the PermitView System 1. As such, when an individual or associated vehicle having a prohibited status attempts to process payment for a pay-to-park space, the PermitView System 1 may notify the individual of his or her prohibited status and inform the individual that parking is prohibited absent resolution of the outstanding violations. In addition, the PermitView System 1 may prompt the individual for payment of any outstanding fees or fines in order to remove the prohibited status. One having ordinary skill in the art will appreciate that the communication between the PermitView System 1 and the individual may be via any suitable communication means, such as, for example, via telephone and/or via a multi-space meter or similar interactive display provided in the pay-to-park environment.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A parking management system comprising:
  a detection module for detecting scofflaw violations, the detection module receiving data from a remote computer system and capturing a unique identifier associated with a parked vehicle, the detection module analyzing the data and the unique identifier in order to determine if a scofflaw violation is occurring and for issuing at least one enforcement action based upon the scofflaw violation;
  an enforcement module for executing the at least one enforcement action, the at least one enforcement action including immobilization of the parked vehicle via placement of a locking boot utilizing a boot release code on a tire of a vehicle; and
  a resolution module for facilitating performance of remedial measures, the resolution module including a payment module for receiving payment of a fine associated with the at least one enforcement action by an operator of the vehicle, a release module for communicating the boot release code to the operator for releasing the parked vehicle from immobilization upon payment of the fine and a return module for communicating instructions to the operator for return of the locking boot,
  wherein the fine associated with the at least one enforcement action further comprises a deposit amount, returnable to the operator, upon successful removal and return by the operator, of the locking boot, to the parking management system.

2. The system of claim 1, wherein the locking boot includes a boot tag identifier.

3. The system of claim 2, wherein the parking management system comprises a database for storing at least one of the boot tag identifier, a lock code, and an unlock code for the locking boot.

4. The system of claim 1, wherein the locking boot comprises a global positioning system (GPS) receiver.

5. The system of claim 4, wherein the parking management system is configured to track a location of the boot using the GPS receiver.

6. The system of claim 1, wherein the parking management system is communicatively connected to the boot via a pager network.

7. The system of claim 6, wherein the parking management system remotely unlocks the boot by transmitting an unlock code to the boot via the pager network.

8. The system of claim 1, wherein the unique identifier is a vehicle's license plate number.

9. A method for managing a parking program, the method comprising the steps of:
receiving data from a remote computer system and electronically reading a unique identifier associated with a parked vehicle;
analyzing the data and the unique identifier in order to determine if a scofflaw violation is occurring;
issuing at least one enforcement action based upon the scofflaw violation;
executing the at least one enforcement action, the at least one enforcement action including immobilization of the parked vehicle via placement of a locking boot utilizing a boot release code on a tire of a vehicle; and
facilitating performance of remedial measures, the at least one remedial measure including paying a fine associated with the at least one enforcement action by an operator of the vehicle, communicating the boot release code to the operator for releasing the parked vehicle from immobilization upon payment of the fine and a return module for communicating instructions to the operator for return of the locking boot,
wherein the fine associated with the at least one enforcement action further comprises a deposit amount, returnable to the operator, upon successful removal and return by the operator, of the locking boot, to the parking management system.

10. The method of claim 9, wherein the unique identifier is a vehicle's license plate number.

11. The method of claim 9, wherein the locking boot comprises a boot RFID tag which stores a boot tag identifier.

12. The method of claim 11, wherein the boot tag identifier is associated with a code for unlocking the boot.

13. The method of claim 9, further comprising:
receiving parked vehicle data from a mobile device.

14. A parking management system comprising:
a detection module for detecting scofflaw violations, the detection module receiving data from a remote computer system and capturing a unique identifier associated with a parked vehicle, the detection module analyzing the data and the unique identifier in order to determine if a scofflaw violation is occurring and for issuing at least one enforcement action based upon the scofflaw violation;
an enforcement module for executing the at least one enforcement action, the at least one enforcement action including immobilization of the parked vehicle via placement of a locking boot utilizing a boot release code on a tire of a vehicle and communicating an identification number of the locking boot to a database;
a resolution module for facilitating performance of remedial measures, the resolution module including a payment module for receiving payment of a fine associated with the at least one enforcement action by an operator of the vehicle, a release module for communicating the boot release code to the operator for releasing the parked vehicle from immobilization upon payment of the fine and a return module for communicating instructions to the operator for return of the locking boot and verifying the identification number of the locking boot being returned matches the identification number communicated to the database.

* * * * *